(12) United States Patent
Marple et al.

(10) Patent No.: US 9,325,018 B2
(45) Date of Patent: Apr. 26, 2016

(54) LITHIUM-IRON DISULFIDE CELL DESIGN

(71) Applicant: Energizer Brands, LLC, St. Louis, MO (US)

(72) Inventors: Jack W. Marple, Avon, OH (US); Duane James, Middleburg Heights, OH (US); Weiwei Huang, Westlake, OH (US)

(73) Assignee: ENERGIZER BRANDS, LLC, St. Louis, MO (US)

( * ) Notice: Subject to any disclaimer, the term of this patent is extended or adjusted under 35 U.S.C. 154(b) by 0 days.

(21) Appl. No.: 14/298,996

(22) Filed: Jun. 9, 2014

(65) Prior Publication Data

US 2014/0283377 A1    Sep. 25, 2014

Related U.S. Application Data

(62) Division of application No. 13/073,118, filed on Mar. 28, 2011, now Pat. No. 8,859,146.

(51) Int. Cl.
| | |
|---|---|
| *H01M 4/52* | (2010.01) |
| *H01M 6/04* | (2006.01) |
| *H01M 4/04* | (2006.01) |
| *H01M 4/38* | (2006.01) |
| *H01M 4/58* | (2010.01) |
| *H01M 6/02* | (2006.01) |
| *H01M 6/16* | (2006.01) |

(52) U.S. Cl.
CPC .............. *H01M 6/04* (2013.01); *H01M 4/0495* (2013.01); *H01M 4/381* (2013.01); *H01M 4/52* (2013.01); *H01M 4/581* (2013.01); *H01M 6/02* (2013.01); *H01M 6/16* (2013.01); *Y10T 29/49108* (2015.01); *Y10T 29/49115* (2015.01)

(58) Field of Classification Search
None
See application file for complete search history.

(56) References Cited

U.S. PATENT DOCUMENTS

| | | | |
|---|---|---|---|
| 4,184,012 | A | 1/1980 | Barrella |
| 4,379,815 | A | 4/1983 | Bubnick |
| 5,290,414 | A | 3/1994 | Marple |

(Continued)

FOREIGN PATENT DOCUMENTS

| | | |
|---|---|---|
| EP | 0942484 A1 | 9/1999 |
| JP | 10 326629 A | 12/1998 |
| WO | WO-2008013853 A2 | 1/2008 |

OTHER PUBLICATIONS

International Search Report and Written Opinion from International Application No. PCT/US2012/030659, dated Mar. 28, 2011, 8 pages.

*Primary Examiner* — Ula C Ruddock
*Assistant Examiner* — Frank Chernow
(74) *Attorney, Agent, or Firm* — McDonald Hopkins LLC

(57) ABSTRACT

The invention relates to primary electrochemical cells, in addition to methods for manufacturing and discharging the same, having a jellyroll electrode assembly that includes a positive electrode with a coating comprising iron disulfide deposited on a current collector situated on the outermost circumference of the jellyroll, a lithium-based negative electrode and a polymeric separator. More particularly, the invention relates to a cell design which optimizes cell capacity and substantially eliminates premature voltage drop-off on intermittent service testing by eliminating the edge effect through, for example, deliberately relieving stack pressure and/or extending the distance lithium ions proximate to the terminal end of the positive electrode must travel to undergo an electrochemical reaction in that region.

14 Claims, 12 Drawing Sheets

(56) References Cited

U.S. PATENT DOCUMENTS

| | | |
|---|---|---|
| 5,458,993 A | 10/1995 | Terao et al. |
| 5,654,114 A | 8/1997 | Kubota et al. |
| 5,965,290 A | 10/1999 | Shimizu et al. |
| 6,391,488 B1 | 5/2002 | Shimizu et al. |
| 6,849,360 B2 | 2/2005 | Marple |
| 7,157,185 B2 | 1/2007 | Marple |
| RE41,886 E | 10/2010 | Marple |
| 2003/0228518 A1 | 12/2003 | Marple |
| 2005/0031949 A1 | 2/2005 | Maeda |
| 2005/0079404 A1 | 4/2005 | Schubert et al. |
| 2005/0112462 A1 | 5/2005 | Marple et al. |
| 2005/0233214 A1 | 10/2005 | Marple et al. |
| 2005/0244706 A1 | 11/2005 | Wu et al. |
| 2007/0275298 A1 | 11/2007 | Igoris et al. |
| 2008/0026288 A1 | 1/2008 | Marple et al. |
| 2008/0026293 A1 | 1/2008 | Marple et al. |
| 2008/0076022 A1 | 3/2008 | Marple |
| 2008/0213651 A1 | 9/2008 | Wu et al. |
| 2008/0226982 A1 | 9/2008 | Schubert |
| 2008/0254343 A1 | 10/2008 | Kaplin et al. |
| 2009/0104520 A1 | 4/2009 | Marple |
| 2010/0255357 A1 | 10/2010 | Baek et al. |
| 2010/0310910 A1 | 12/2010 | Huang et al. | ated to the fact that its reaction end products occupy substantially more volume than the original inputs, which leads to swelling of the electrode assembly as the battery discharges. In turn, this swelling can cause unwanted bulging (or, in extreme cases, splitting) of the cell container. The increased force within the electrode stack may also lead to short circuits if the separator is compromised and/or anode disconnects which reduce the amount of capacity actually delivered by the battery. In particular, the radial pressure caused by the expanding iron disulfide cathode forces cell designers to preferentially locate the anode lead on the outer- or inner-most wind of the jellyroll to minimize the effect that the non-active lead could have as the entire jellyroll is compressed.

LITHIUM-IRON DISULFIDE CELL DESIGN

CROSS-REFERENCE TO RELATED APPLICATIONS

This application is a divisional of U.S. patent application Ser. No. 13/073,118, filed Mar. 28, 2011, entitled "Lithium-Iron Disulfide Cell Design." The aforementioned related application is hereby incorporated by reference.

FIELD OF INVENTION

The invention relates to primary lithium-iron disulfide electrochemical cells, in addition to methods for manufacturing and discharging the same. More particularly, the invention relates to a cell design and construction method which optimizes cell capacity and substantially eliminates premature voltage drop-off on intermittent service testing.

BACKGROUND

Primary batteries are a cost effective disposable portable power source for a wide variety of consumer devices, although only a handful of standardized cell sizes (e.g., AA or AAA) and specific nominal voltages (typically 1.5 V) are typically utilized. Consumers often prefer and opt to use primary batteries for their convenience, reliability, sustained shelf life and more economical per unit price as compared to currently available rechargeable (i.e., secondary) batteries.

Many electronic devices, such as digital still cameras, are designed with relatively high power operating requirements. However, many of the historically-used primary battery chemistries (e.g., carbon zinc, alkaline, etc.) are not ideally suited for such high power applications. Furthermore, the need for specified nominal voltages significantly limits the selection of potential electrochemical materials, while the use of standardized cell sizes restricts the overall available internal volume available for active materials, safety devices and other similar elements and features typically required for consumer products. Smaller nominal voltage cells are preferred because they can be provided separately or in series, thereby giving device makers more design options and versatility. Designing a device to use primary batteries also presents significant cost advantages in comparison to secondary systems. Thus, 1.5 V primary systems, such as alkaline or lithium-iron disulfide systems, tend to be more prominent than higher voltage and/or rechargeable batteries.

Even among the 1.5V electrochemical systems (e.g., alkaline v. lithium-iron disulfide, etc.), the design considerations are significantly different. For example, alkaline and nickel oxy-hydroxide systems rely on an aqueous and highly caustic electrolyte that has a propensity for gas expansion and/or leakage. These issues lead to very different approaches in terms of selection of internal materials and/or compatibility with containers and closures as compared to non-aqueous systems. In rechargeable 1.5 V systems (note that lithium-iron disulfide systems are not currently considered suitable for consumer-based rechargeable systems), various highly specialized components and electrochemical and/or electrolyte compositions are used to best accommodate lithium ion charge/discharge cycling. Here, such high cost components are not a key design concern because secondary systems typically sell for a higher retail price than their primary battery equivalents. Ultimately, the discharge mechanisms, cell designs and safety considerations are, by and large, inconsequential and/or inapplicable between primary and secondary battery systems, and even among primary systems, it is difficult to adopt or interchange cell designs, materials' selections and the like.

For example, in 1.5 volt lithium-iron disulfide primary batteries, a discontinuity in the anode (which does not have an embedded current collector running along its entire length) can lead to a loss in the overall expected capacity of the battery. Thus, as described in United States Patent Publication Nos. 2003/0228518 and 2010/0310910, various mechanisms have been proposed to address and eliminate such "anode disconnects". In contrast, in 3.0 volt lithium-manganese dioxide primary batteries, anode disconnects, such as those described in U.S. Pat. Nos. 5,965,290 and 6,391,488, can be deliberately engineered into the cell design to act as a safety feature (i.e., the portion of the anode which is connected to the battery terminal is disconnected from the rest of the anode to avoid short circuits if the battery is exposed to a forced discharge condition). Therefore, battery materials and designs should only be considered within the context of that particular battery system.

Although lithium-iron disulfide cells have distinct advantages for high power devices (as compared to primary alkaline cells), cell designs must also strike a balance between the cost of materials used, the incorporation of necessary safety devices and the overall reliability and capacity of the cell's design. Safety devices normally include venting mechanisms and thermally activated "shutdown" elements, such as positive thermal circuits (PTCs), while improvements to reliability primarily focus on preventing internal short circuits and maintaining the integrity of the electrodes, and especially the anode (as noted above). However, these safety and reliability elements occupy internal volume and/or require design principles that can be counterproductive to cell internal resistance, efficiency and overall discharge capacity.

Another challenge unique to lithium-iron disulfide systems relates to the fact that its reaction end products occupy substantially more volume than the original inputs, which leads to swelling of the electrode assembly as the battery discharges. In turn, this swelling can cause unwanted bulging (or, in extreme cases, splitting) of the cell container. The increased force within the electrode stack may also lead to short circuits if the separator is compromised and/or anode disconnects which reduce the amount of capacity actually delivered by the battery. In particular, the radial pressure caused by the expanding iron disulfide cathode forces cell designers to preferentially locate the anode lead on the outer- or inner-most wind of the jellyroll to minimize the effect that the non-active lead could have as the entire jellyroll is compressed.

Previous means of handling these problems include using stronger (often thicker) materials for the cell housing and inactive components within the cell. However, thicker inactive materials limit the internal volume available and thicker, more rugged electrodes accommodate fewer winds in the jellyroll, resulting in less surface area between the electrodes and comparatively lower battery performance at higher drain rates.

A number of approaches have been taken to strike an appropriate balance between optimal internal volume utilization and acceptable $LiFeS_2$ cell capacity/performance. For example, a possible solution for problems created by swelling, disclosed in U.S. Pat. No. 4,379,815, is to balance cathode expansion and anode contraction by mixing one or more other active materials (such as $CuO$, $Bi_2O_3$, $Pb_2Bi_2O_5$, $P_3O_4$, $CoS_2$) with pyrite, although these additional materials can negatively affect the discharge characteristics of the cell, and the capacity and efficiency of the overall cell may also suffer.

Other means of improving discharge capacity in LiFeS$_2$ cell contemplate the use of thinner separators and/or specific cathode coating mixes and coating techniques, as disclosed in U.S. Patent Publication Nos. 20050112462 and 20050233214, or through the adjustment of interfacial input materials, as disclosed in U.S. Pat. Nos. 6,849,360 and 7,157,185. To the extent some of these solutions remove volume that could be occupied by active material in the battery, these solutions would not necessarily improve the battery's overall discharge capacity.

Ultimately, improvements to capacity represent a fundamentally sound battery design. That is, in order to deliver greater capacity, careful consideration must be given for the radial expansion forces and other dynamics at work in a discharging lithium-iron disulfide battery. For example, if the design provides inadequate thickness in the anode or the cathode current collector then the radial forces during discharge may compress the jellyroll to such a degree so as to cause a disconnect in one or both electrodes and, once this disconnect occurs, the battery may cease to deliver capacity regardless of whether the active materials have all been discharged. Similar situations arise with respect to the void volume (in the cathode coating and the interior of the cell as a whole), the electrical connections throughout the battery, the separator, the closure/venting mechanism for the battery and the like. Therefore, the capacity of a LiFeS$_2$ cell is a significant metric for the overall viability and robustness of a cell design, particularly when the cell designer is limited to the use of a standard-sized (i.e., fixed volume) consumer battery (e.g., AA or FR6; AAA or FR03; etc.)

As a corollary to the capacity acting as a de facto metric for battery design, those skilled in the art will appreciate that design choices, and particularly the selection of specific components, must be made in consideration of the overall context of the lithium-iron disulfide system. A specific composition may have surprising, unexpected or unintended effects upon the other components and compositions within the cell. Similarly, in standard sized batteries, the selection of a particular element occupies volume within the container that might otherwise have been available for other elements. Thus, this interdependency of design choices necessarily means that any increase in capacity, and especially an increase that does not negatively impact the safety or performance of the battery in other regards, is much more than a simple act of adding more active materials. Similarly, the selection of inactive components, such as solvents, solutes, binders, conductors, polymers and the like, must necessarily be made in context of the exigencies of the situation, and isolating single items from an extensive list of possibilities is not by itself sufficient reason for an artisan to consider using in that particular combination.

Tests that simulate the actual discharge or use of the battery have particular relevance to evaluating cell designs. Typically, these simulated-use tests involve discharging the battery under specified discharge conditions (e.g., a constant load of 200 mA) continuously or in a predetermined cycle (e.g., discharge for a set number of minutes, followed by a rest interval of a set number of minutes) until the battery output voltage drops below a final "cut off voltage". As used herein, tests that involve a cycle of discharge and rest intervals will be generically referred to as intermittent drain rate tests. Clearly, with any simulated use test, it is necessary to specify the discharge conditions, periods of time for discharge and the rest interval (if used) and the cut off voltage.

BRIEF DESCRIPTION OF DRAWINGS

FIG. 8A comparatively graphs the discharge performance for the batteries described in Example 2 below, while

SUMMARY OF INVENTION

Figure 1:
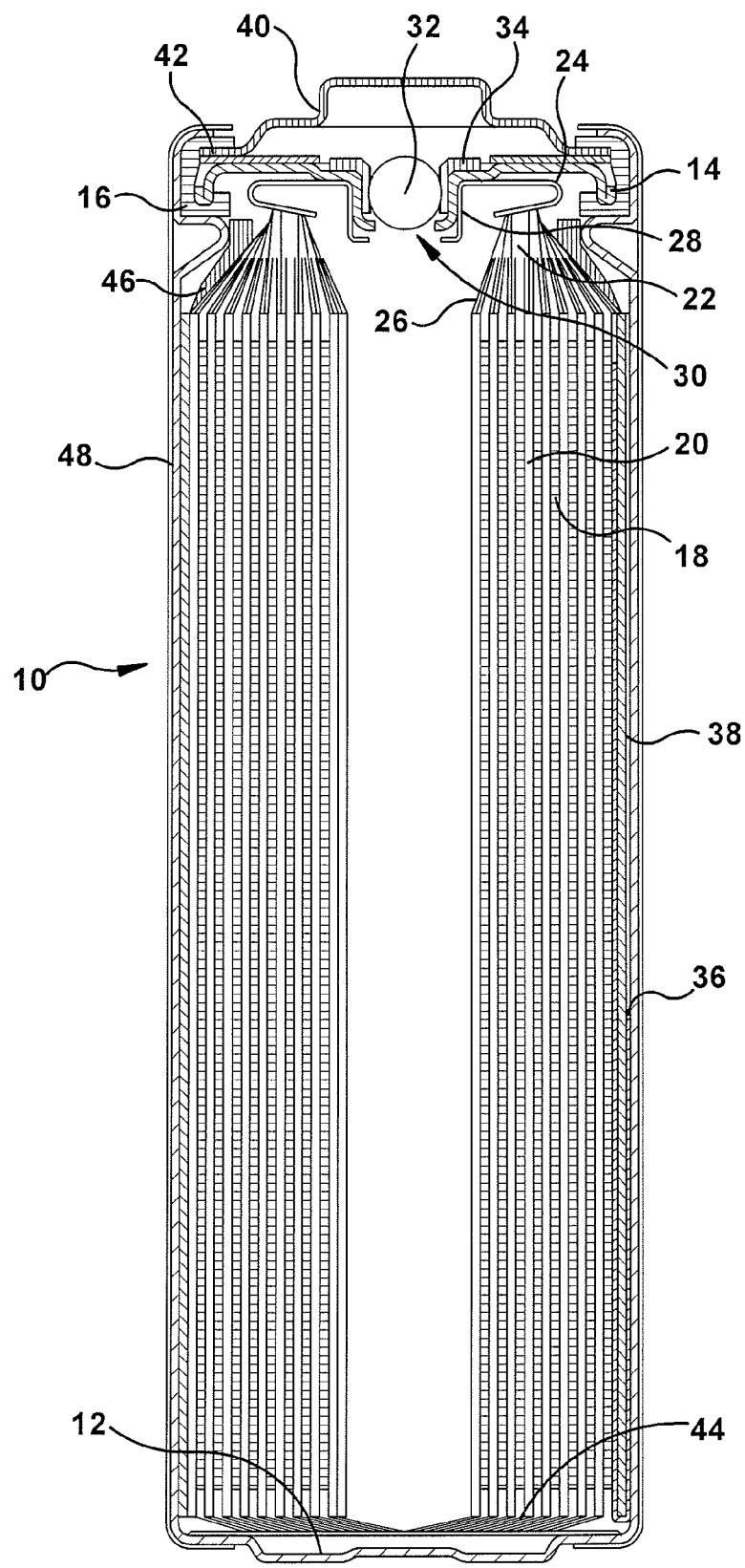
FIG. 1 illustrates one embodiment of a cell design for a lithium-iron disulfide electrochemical cell.

The invention comprises a plurality of embodiments for a lithium-iron disulfide electrochemical cell, along with methods for making and discharging the same. In each case, the invention improves the discharge capacity of the battery.

As such, embodiments directed toward an electrochemical cell may include any one or combination of the following elements:
a container;
an organic, non-aqueous electrolyte;
an spirally wound electrode assembly having a separator, an anode consisting essentially of lithium or a lithium alloy strip and a cathode having active material disposed on both sides of a current collector having a terminal edge oriented on an outermost surface of the spirally wound electrode assembly;
a spacer situated proximate to or at least partially beneath the terminal edge having a thickness that is: i) at least twice the thickness of the cathode, inclusive of the coating on both sides and the current collector, or ii) greater than a combined thickness of the anode, the cathode and the separator;
an electrode assembly having an anode consisting essentially of lithium or a lithium alloy strip, a porous cathode comprising an active material containing iron disulfide or manganese dioxide disposed onto both sides of a metallic current collector and a separator disposed between the anode and the cathode;
means for eliminating the edge effect positioned proximate to the cathode in the outermost surface of the electrode assembly;
wherein the means for eliminating the edge effect comprises an retardant disposed on or in the cathode coating along an axial strip at a terminal edge of the cathode;
wherein the means for eliminating the edge effect comprises a pore-blocking substance disposed within the cathode coating along an axial strip at a terminal edge of the cathode;
wherein the cell possesses an interfacial anode under-balance the anode and the cathode are spirally wound so that less than 50% of an outermost surface of the electrode assembly, excluding the separator and optional non-active components, is covered by the anode;

wherein the spacer comprises a plurality of members;

wherein the members are stacked on top of one another;

wherein the members are aligned along an axis that coincides with the terminal edge of the cathode;

wherein the spacer comprises an elastomeric material;

wherein the cell the anode and the cathode are spirally wound so as to have a cathode outer wrap;

wherein the cathode includes a zone of reduced electrochemical reactivity throughout the entire cathode along its terminal edge on an outermost surface of the spirally wound electrode assembly;

wherein the zone of reduced electrochemical reactivity is characterized by a reduction or elimination of ionic conductivity of cathode pores within the zone; and/or wherein the zone of reduced electrochemical reactivity is created by a spacer having a thickness that is: i) at least twice the thickness of the cathode, inclusive of the coating on both sides and the current collector, or ii) greater than a combined thickness of the anode, the cathode and the separator inserted between the anode and the cathode proximate to the terminal edge of the cathode.

In the same manner, the method for making a cathode outer wrap battery which does not experience premature voltage drop-off upon intermittent discharge of the battery may comprise any one or combination of the following steps:

continuously coating a cathode mixture comprising iron disulfide onto both sides of a solid foil current collector and subsequently creating a plurality of zones of reduced electrochemical activity on at least one side of the current collector;

cutting the coated cathode into individual strips to create a plurality of individual cathodes so that the zone of reduced electrochemical activity is positioned at a terminal end of each individual cathode;

providing a separator and an anode consisting essentially of lithium or a lithium alloy wherein the anode does not include a current collector;

spirally winding the anode, the individual cathode strip and the separator into a electrode assembly so that less than 50% of an outermost surface of the electrode assembly, excluding the separator and optional non-active components, is covered by the anode and the zone of reduced electrochemical activity is situated along the outermost surface of the electrode assembly;

disposing the electrode assembly in a conductive container, introducing a non-aqueous electrolyte to the container and closing the container;

wherein the zone of reduced electrochemical activity is created by creating a mass free zone prior to disposing the electrode assembly in the container;

wherein the mass free zone is created by providing a sacrificial substrate to the current collector prior to coating the cathode mixture and then removing the sacrificial substrate subsequent to coating the cathode mixture;

wherein the mass free zone is created by physically removing the cathode coating as the cathode is cut into individual strips;

wherein the zone of reduced electrochemical activity is created by discharging the cathode in the zone prior to disposing the electrode assembly in the container;

wherein the zone of reduced electrochemical activity is created by insulating the cathode mixture from ionic conductivity within the zone prior to disposing the electrode assembly in the container;

wherein the zone of reduced electrochemical activity is created by reducing an amount of active cathode material in the zone prior to disposing the electrode assembly in the container;

wherein the amount of cathode active material is reduced by reducing the thickness of the cathode coating;

wherein the zone of reduced electrochemical activity is created by utilizing an initiator to induce a change within the cathode;

wherein the initiator is selected from radiation, electromagnetic radiation or a light source;

wherein the cathode mixture includes a chemical which reacts with or to the initiator;

wherein the zone of reduced electrochemical activity is created by providing a spacer having a thickness that is: i) at least twice the thickness of the cathode, inclusive of the coating on both sides and the current collector, or ii) greater than a combined thickness of the anode, the cathode and the separator between the anode and the individual cathode strip proximate to the terminal end;

wherein the zone of reduced electrochemical activity is created by relieving electrode stack pressure at the terminal end as the cell discharged; and/or wherein the anode is provided in an amount to create an interfacial, theoretical anode-to-cathode input capacity ratio that is less than 1.0.

Similarly, the method for improving the discharge capacity of a lithium-iron disulfide cylindrical electrochemical cell with a cathode continuously coated onto both sides of a current collector may comprise any one or combination of the following steps:

providing a lithium-iron disulfide electrochemical cell with a spiral wound electrode assembly having an interfacial anode under-balance and a cathode outer wrap;

creating a localized area of reduced electrochemical activity at a terminal end of the cathode strip and positioning said localized area of reduced electrochemical activity proximate to the anode along the outermost surface; and/or causing the cell to be discharged.

DESCRIPTION OF OTHER PREFERRED ELEMENTS

Unless otherwise specified, as used herein the terms listed below are defined and used throughout this disclosure as follows:

ambient temperature or room temperature—between about 20° C. and about 25° C.; unless otherwise stated, all examples, data and other performance and manufacturing information were conducted at ambient temperature and under normal atmospheric conditions;

anode—the negative electrode; more specifically, in a lithium-iron disulfide cell, a thin strip essentially of lithium or lithium-based alloy (i.e., an alloy containing at least 90% lithium by weight) to serve as the primary electrochemically active material and preferably formed without a current collector;

capacity—the capacity delivered by a single electrode or an entire cell during discharge at a specified set of conditions (e.g., drain rate, temperature, etc.); typically expressed in milliamp-hours (mAh) or milliwatt-hours (mWh) or by the number of minutes or images taken on the digital still camera test;

cathode—the positive electrode; more specifically, in a lithium-iron disulfide cell, it comprises iron disulfide as the primary electrochemically active material, preferably mixed along with one or more rheological, polymeric and/or conductive additives and coated onto a solid, metallic foil current collector;

cell housing—the structure that physically encloses the electrode assembly, including all internally enclosed safety devices, inert components and connecting materials which comprise a fully functioning battery; typically these will include a container (formed in the shape of a cup, also referred to as a "can") and a closure (fitting over the opening of the container and normally including venting and sealing mechanisms for impeding electrolyte egress and moisture/atmospheric ingress); depending upon the context may sometimes be used interchangeably with the terms can or container;

cylindrical cell size—any cell housing having a circular-shaped cylinder with a height that is greater than its diameter; this definition specifically excludes button cells, miniature cells or experimental "hockey puck" cells;

electrochemically active material—one or more chemical compounds that are part of the discharge reaction of a cell and contribute to the cell discharge capacity, but including impurities and small amounts of other moieties inherent to the material;

FR6 or AA-sized cell—With reference to International Standard IEC-60086-1 published by the International Electrotechnical Commission on after November 2000, a cylindrical cell size lithium iron disulfide battery with a maximum external height of about 50.5 mm and a maximum external diameter of about 14.5 mm;

FR03 or AAA-sized cell—With reference to International Standard IEC-60086-1 published by the International Electrotechnical Commission on after November 2000, a cylindrical cell size lithium iron disulfide battery with a maximum external height of about 44.5 mm and a maximum external diameter of about 10.5 mm;

"jellyroll" (or "spirally wound") electrode assembly—strips of anode and cathode, along with an appropriate polymeric separator, are combined into an assembly by winding along their lengths or widths, e.g., around a mandrel or central core;

pyrite—a preferred mineral form of iron disulfide for electrochemical cell applications, typically containing about 95 wt. % or greater of electrochemically active iron disulfide, encompassing natural or deliberate variations to the stoichiometric composition of electrochemically active material (i.e., minor amounts of other iron sulfides and/or doped metal sulfides may be present), with the remainder representing impurities and/or non-electrochemically active species; depending upon the context, pyrite may be used interchangeably with iron disulfide.

With respect to the basic cell design, the invention will be better understood with reference to FIG. 1. In FIG. 1, the cell 10 is one embodiment of a FR6 (AA) type cylindrical LiFeS$_2$ battery cell, although the invention should have equal applicability to FR03 (AAA) or other cylindrical cells. The cell 10 has, in one embodiment, a housing that includes a container in the form of can 12 with a closed bottom and an open top end that is closed with a cell cover 14 and a gasket 16. The can 12 has a bead or reduced diameter step near the top end to support the gasket 16 and cover 14. The gasket 16 is compressed between the can 12 and the cover 14 to seal an anode or negative electrode 18, a cathode or positive electrode 20 and electrolyte within the cell 10.

The anode 18, cathode 20 and a separator 26 are spirally wound together into an electrode assembly. The cathode 20 has a metal current collector 22, which extends from the top end of the electrode assembly and is connected to the inner surface of the cover 14 with a contact spring 24. The anode 18 is electrically connected to the inner surface of the can 12 by a metal lead (or tab) 36. The lead 36 is fastened to the anode 18, extends from the bottom of the electrode assembly, and is folded across the bottom and up along the side of the electrode assembly. The lead 36 makes pressure contact with the inner surface of the side wall of the can 12. After the electrode assembly is wound, it can be held together before insertion by tooling in the manufacturing process, or the outer end of material (e.g., separator or polymer film outer wrap 38) can be fastened down, by heat sealing, gluing or taping, for example.

In one embodiment, an insulating cone 46 is located around the peripheral portion of the top of the electrode assembly to prevent the cathode current collector 22 from making contact with the can 12, and contact between the bottom edge of the cathode 20 and the bottom of the can 12 is prevented by the inward-folded extension of the separator 26 and an electrically insulating bottom disc 44 positioned in the bottom of the can 12.

In one embodiment, the cell 10 has a separate positive terminal cover 40, which is held in place by the inwardly crimped top edge of the can 12 and the gasket 16 and has one or more vent apertures (not shown). The can 12 serves as the negative contact terminal. An insulating jacket, such as an adhesive label 48, can be applied to the side wall of the can 12.

In one embodiment, disposed between the peripheral flange of the terminal cover 40 and the cell cover 14 is a positive temperature coefficient (PTC) device 42 that substantially limits the flow of current under abusive electrical conditions. In another embodiment, the cell 10 may also include a pressure relief vent. The cell cover 14 has an aperture comprising an inward projecting central vent well 28 with a vent hole 30 in the bottom of the well 28. The aperture is sealed by a vent ball 32 and a thin-walled thermoplastic bushing 34, which is compressed between the vertical wall of the vent well 28 and the periphery of the vent ball 32. When the cell internal pressure exceeds a predetermined level, the vent ball 32, or both the ball 32 and bushing 34, is forced out of the aperture to release pressurized gases from the cell 10. In other embodiments, the pressure relief vent can be an aperture closed by a rupture membrane, such as disclosed in U.S. Patent Application Publication Nos. 20050244706 and 20080213651, which are incorporated by reference, or a relatively thin area such as a coined groove, that can tear or otherwise break, to form a vent aperture in a portion of the cell, such as a sealing plate or container wall.

In one embodiment, the terminal portion of the electrode lead 36, disposed between the side of the electrode assembly and the side wall of the can, may have a shape prior to insertion of the electrode assembly into the can, preferably non-planar, that enhances electrical contact with the side wall of the can and provides a spring-like force to bias the lead against the can side wall. During cell manufacture, the shaped terminal portion of the lead can be deformed, e.g., toward the side of the electrode assembly, to facilitate its insertion into the can, following which the terminal portion of the lead can spring partially back toward its initially non-planar shape, but remain at least partially compressed to apply a force to the inside surface of the side wall of the can, thereby making good physical and electrical contact with the can. Alternatively, this connection, and/or others within the cell, may also be maintained by way of welding.

The cell container is often a metal can with a closed bottom such as the can in FIG. 1. The can material and thickness of the container wall will depend in part of the active materials and electrolyte used in the cell. A common material type is steel. For example, the can may be made of cold rolled steel (CRS), and may be plated with nickel on at least the outside to protect the outside of the can from corrosion. Typically, CRS containers according to the invention can have a wall thickness of approximately between 7 and 10 mils for a FR6 cell, or 6 to 9 mils for a FR03 cell. The type of plating can be varied to provide varying degrees of corrosion resistance, to improve the contact resistance or to provide the desired appearance. The type of steel will depend in part on the manner in which the container is formed. For drawn cans, the steel can be a diffusion annealed, low carbon, aluminum killed, SAE 1006 or equivalent steel, with a grain size of ASTM 9 to 11 and equiaxed to slightly elongated grain shape. Other steels, such as stainless steels, can be used to meet special needs. For example, when the can is in electrical contact with the cathode, a stainless steel may be used for improved resistance to corrosion by the cathode and electrolyte.

Figure 4A:
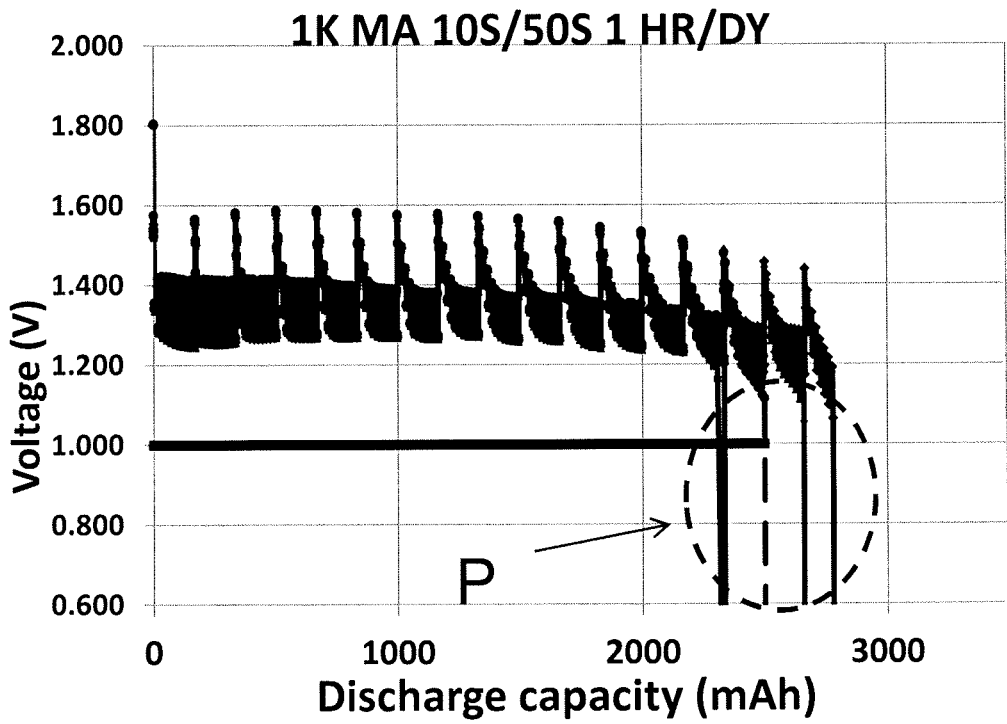
Figure 4B:
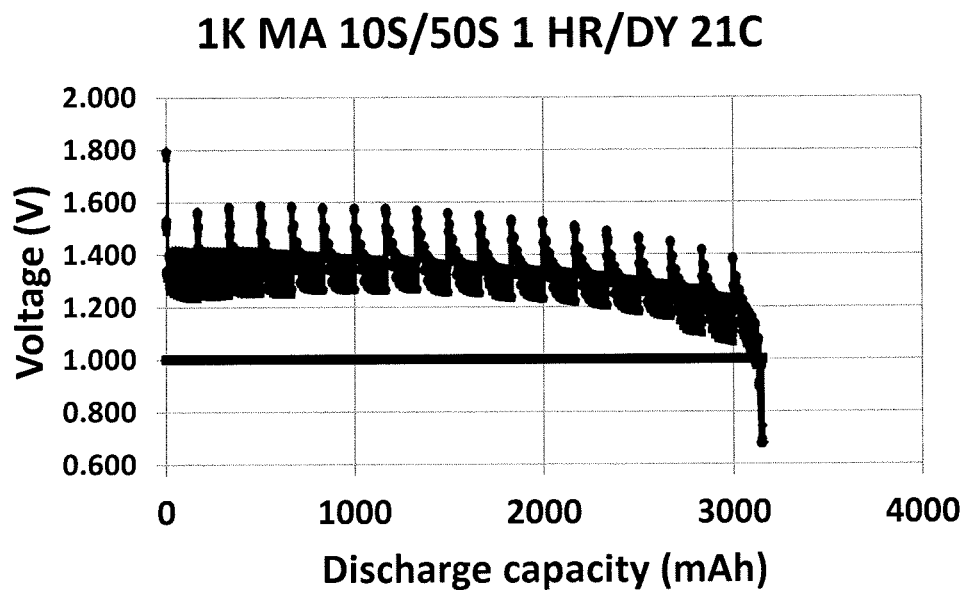

The cell cover can be metal. Nickel plated steel may be used, but a stainless steel is often desirable, especially when the closure and cover are in electrical contact with the cathode. The complexity of the cover shape will also be a factor in material selection. The cell cover may have a simple shape, such as a thick, flat disk, or it may have a more complex shape, such as the cover shown in FIG. 1. When the cover has a complex shape like that in FIG. 4, a type 304 soft annealed stainless steel with ASTM 8-9 grain size may be used to provide the desired corrosion resistance and ease of metal forming. Formed covers may also be plated, with nickel for example, or made from stainless steel or other known metals and their alloys.

The terminal cover should have good resistance to corrosion by water in the ambient environment or other corrosives commonly encountered in battery manufacture and use, good electrical conductivity and, when visible on consumer batteries, an attractive appearance. Terminal covers are often made from nickel plated cold rolled steel or steel that is nickel plated after the covers are formed. Where terminals are located over pressure relief vents, the terminal covers generally have one or more holes to facilitate cell venting.

The gasket used to perfect the seal between the can and the closure/terminal cover may be made from any suitable thermoplastic material that provides the desired sealing properties. Material selection is based in part on the electrolyte composition. Examples of suitable materials include polypropylene, polyphenylene sulfide, tetrafluoride-perfluoroalkyl vinyl ether copolymer, polybutylene terephthalate and combinations thereof. Preferred gasket materials include polypropylene (e.g., PRO-FAX® 6524 from Basell Polyolefins in Wilmington, Del., USA) and polyphenylene sulfide (e.g., XTEL™ XE3035 or XE5030 from Chevron Phillips in The Woodlands, Tex., USA). Small amounts of other polymers, reinforcing inorganic fillers and/or organic compounds may also be added to the base resin of the gasket. Examples of suitable materials can be found in U.S. Patent Publication Nos. 20080226982 and 20050079404, which are incorporated by reference.

The gasket may be coated with a sealant to provide the best seal. Ethylene propylene diene terpolymer (EPDM) is a suitable sealant material, but other suitable materials can be used.

The anode comprises a strip of lithium metal, sometimes referred to as lithium foil. The composition of the lithium can vary, though for battery grade lithium the purity is always high. The lithium can be alloyed with other metals, such as aluminum, to provide the desired cell electrical performance or handling ease, although the amount of lithium in any alloy should nevertheless be maximized and alloys designed for high temperature application (i.e., above the melting point of pure lithium) are not contemplated. Appropriate battery grade lithium-aluminum foil, containing 0.5 weight percent aluminum, is available from Chemetall Foote Corp., Kings Mountain, N.C., USA. An anode consisting essentially of lithium or a lithium alloy (for example, 0.5 wt. % Al and 99+wt. % Li) is preferred, with an emphasis placed on maximizing the amount of active material (i.e., lithium) in any such alloy.

As in the cell in FIG. 1, a separate current collector (i.e., an electrically conductive member, such as a metal foil, on which the anode is welded or coated, or an electrically conductive strip running along substantial portions the length of the anode such that the collector would be spirally wound within the jellyroll) is not needed for the anode, since lithium has a high electrical conductivity. If used, an anode current collectors would be made of copper and/or other appropriate high conductivity metals that are stable when exposed to the other interior components of the cell (e.g., electrolyte), although this is not ideal for lithium-iron disulfide cells since the volume occupied by such an anode current collector would have a substantial negative impact on the cell's rated capacity.

The electrical connection is maintained between each of the electrodes and the opposing external battery terminals, which are proximate to or integrated with the housing. An electrical lead 36 can be made from a thin metal strip connecting the anode or negative electrode to one of the cell terminals (the can in the case of the FR6 cell shown in FIG. 1). This may be accomplished embedding an end of the lead within a portion of the anode or by simply pressing a portion such as an end of the lead onto the surface of the lithium foil. The lithium or lithium alloy has adhesive properties and generally at least a slight, sufficient pressure or contact between the lead and electrode will weld the components together. The negative electrode may be provided with a lead prior to winding into a jellyroll configuration. The lead may also be connected via appropriate welds.

The metal strip comprising the lead 36 is often made from nickel or nickel plated steel with sufficiently low resistance (e.g., generally less than 15 mΩ/cm and preferably less than 4.5 mΩ/cm) in order to allow sufficient transfer of electrical current through the lead. Examples of suitable negative electrode lead materials include, but are not limited to, copper, copper alloys, for example copper alloy 7025 (a copper, nickel alloy comprising about 3% nickel, about 0.65% silicon, and about 0.15% magnesium, with the balance being copper and minor impurities); and copper alloy 110; and stainless steel. Lead materials should be chosen so that the composition is stable within the electrochemical cell including the nonaqueous electrolyte.

The cathode is in the form of a strip that comprises a current collector and a mixture that includes one or more electrochemically active materials, usually in particulate form. Iron disulfide ($FeS_2$) is the primary active material. The cathode can also contain small amounts of one or more additional active materials, depending on the desired cell electrical and discharge characteristics. The additional active cathode material may be any suitable active cathode material. Examples include metal oxides, $Bi_2O_3$, $C_2F$, $CF_x$, $(CF)_n$, $CoS_2$, CuO, CuS, FeS, $FeCuS_2$, $MnO_2$, $Pb_2Bi_2O_5$ and S. Preferably, the active material for a $Li/FeS_2$ cell cathode comprises at least about 95 weight percent $FeS_2$, and most preferably $FeS_2$ is the sole active cathode material. Pyrite having a purity level of at least 95 weight percent $FeS_2$ is available from Washington Mills, North Grafton, Mass., USA; Chemetall GmbH, Vienna, Austria; and Kyanite Mining Corp., Dillwyn, Va., USA. Note that the discussion of "purity" of $FeS_2$ acknowledges that pyrite is a specific and preferred mineral form of FeS$_2$ and, in certain contexts, these terms are used synonymously herein. However, pyrite often times has small levels of impurities (typically silicon oxides) and, because only the FeS$_2$ is electrochemically active in pyrite, references to percent purity of FeS$_2$ are made with respect to the total amount of pyrite, usually on a weight percentage basis. Thus, at other times, pyrite and FeS$_2$ may not be synonymous when read in proper context. A more comprehensive description of the cathode, its formulation and a manner of manufacturing the cathode is provided below.

The cathode mixture is coated onto one or both sides of a thin metal strip which serves as the cathode current collector. Aluminum is a commonly used material, although titanium, copper, steel, other metallic foils and alloys thereof are also possible. The current collector may extend beyond the portion of the cathode containing the cathode mixture. This extending portion of the current collector can provide a convenient area for making contact with the electrical lead connected to the positive terminal, preferably via a spring or pressure contact that obviates the need for a lead and/or welded contacts. It is desirable to keep the volume of the extending portion of the current collector to a minimum to make as much of the internal volume of the cell available for active materials and electrolyte. Examples of typical coating configurations for the cathode can be found in U.S. Patent Publication No. 20080026293, which is incorporated by reference.

The cathode is electrically connected to the positive terminal of the cell. This may be accomplished with an electrical lead, often in the form of a thin metal strip or a spring, as shown in FIG. 1, although welded connections are also possible. If used, this lead can be made from nickel plated stainless steel or other appropriate materials. In the event an optional current limiting device, such as a standard PTC, is utilized as a safety mechanism to prevent runaway discharge/heating of the cell, a suitable PTC is sold by Tyco Electronics in Menlo Park, Calif., USA. A typical, standard PTC device generally comprises a resistance of approximately 36 mΩ/cm. Other alternatives, including lower resistance devices, are available and may be preferred. Alternative current limiting devices can be found in U.S. Publication Nos. 20070275298 and 20080254343, which are incorporated by reference.

The separator is a thin microporous membrane that is ion-permeable and electrically nonconductive. It is capable of holding at least some electrolyte within the pores of the separator. The separator is disposed between adjacent surfaces of the anode and cathode to electrically insulate the electrodes from each other. Portions of the separator may also insulate other components in electrical contact with the cell terminals to prevent internal short circuits. Edges of the separator often extend beyond the edges of at least one electrode to insure that the anode and cathode do not make electrical contact even if they are not perfectly aligned with each other. However, it is desirable to minimize the amount of separator extending beyond the electrodes. U.S. Pat. No. 5,290,414, issued Mar. 1, 1994, hereby incorporated by reference, describes a suitable type of separator. Other desirable separator properties are described in U.S. Patent Publication No. 20080076022, which is also incorporated by reference.

Separators are often made of polypropylene, polyethylene or both. The separator can be a single layer of biaxially oriented microporous membrane, or two or more layers can be laminated together to provide the desired tensile strengths in orthogonal directions. A single layer is preferred to minimize the cost. The membrane should have a thickness between 16 and 25 microns, depending upon the cathode formulation and constraints on container strength disclosed herein. Suitable separators are available from Tonen Chemical Corp., available from EXXON Mobile Chemical Co., Macedonia, N.Y., USA and Entek Membranes in Lebanon, Oreg., USA.

A nonaqueous electrolyte, containing water only in very small quantities as a contaminant (e.g., no more than about 500 parts per million by weight, depending on the electrolyte salt being used), is used in the battery cell of the invention. The electrolyte contains one or more lithium-based electrolyte salts dissociated in one or more organic solvents. Examples of suitable salts include one or more of the following: lithium bromide, lithium perchlorate, lithium hexafluorophosphate, potassium hexafluorophosphate, lithium hexafluoroarsenate, lithium trifluoromethanesulfonate, lithium bistrifluoromethylsulfonyl imide, lithium tetrafluoroborate and lithium iodide, although the salt preferably includes I$^-$ (e.g., by dissociation of LiI in the solvent blend). Examples of suitable organic solvents include one or more of the following: methyl formate, γ-butyrolactone, sulfolane, acetonitrile, 3,5-dimethylisoxazole, n,n-dimethyl formamide and ethers, although at least 50 volume percent of the total solvents should be ether because their low viscosity and wetting capability appear to positively influence the thicker electrode constructions described below. Preferred ethers can be acyclic (e.g., 1,2-dimethoxyethane, 1,2-diethoxyethane, di(methoxyethyl)ether, triglyme, tetraglyme and diethyl ether) and/or cyclic (e.g., 1,3-dioxolane, tetrahydrofuran, 2-methyl tetrahydrofuran and 3-methyl-2-oxazolidinone). 1,3-dioxolane and 1,2-dimethoxyethane are the preferred solvents, while lithium iodide is the preferred salt, although it may be used in combination with lithium triflate, lithium imide or lithium perchlorate. Additives that result in the creation of I$^-$ dissociated in the solvent blend may also be used, and other additives, such as small amounts of co-solvents which impede polymerization, can be used to impart desired characteristics on the final electrolyte blend.

The anode, cathode and separator strips are combined together in an electrode assembly. The electrode assembly may be a spirally wound design, such as that shown in FIG. 1, made by winding alternating strips of cathode, separator, anode and separator around a mandrel, which is extracted from the electrode assembly when winding is complete. At least one layer of separator and/or at least one layer of electrically insulating film (e.g., polypropylene) is generally wrapped around the outside of the electrode assembly. This serves a number of purposes: it helps hold the assembly together and may be used to adjust the width or diameter of the assembly to the desired dimension. The outermost end of the separator or other outer film layer may be held down with a piece of adhesive tape or by heat sealing. The anode can be the outermost electrode, as shown in FIG. 1, or the cathode can be the outermost electrode. Either electrode can be in electrical contact with the cell container, but internal short circuits between the outmost electrode and the side wall of the container can be avoided by matching the polarity of the outermost wind of the electrode assembly to that of the can.

The cell can be closed and sealed using any suitable process. Such processes may include, but are not limited to, crimping, redrawing, colleting and combinations thereof. For example, for the cell in FIG. 1, a bead is formed in the can after the electrodes and insulator cone are inserted, and the gasket and cover assembly (including the cell cover, contact spring and vent bushing) are placed in the open end of the can. The cell is supported at the bead while the gasket and cover assembly are pushed downward against the bead. The diameter of the top of the can above the bead is reduced with a segmented collet to hold the gasket and cover assembly in place in the cell. After electrolyte is dispensed into the cell through the apertures in the vent bushing and cover, a vent ball is inserted into the bushing to seal the aperture in the cell cover. A PTC device and a terminal cover are placed onto the cell over the cell cover, and the top edge of the can is bent inward with a crimping die to hold and retain the gasket, cover assembly, PTC device and terminal cover and complete the sealing of the open end of the can by the gasket.

With respect to the cathode, the cathode is coated onto a metallic foil current collector, typically an aluminum foil with a thickness between about 16 and 20 μm. The cathode is formed as a mixture which contains a number of materials that must be carefully selected to balance the processability, conductivity and overall efficiency of the coating. These components are mixed into a slurry in the presence of a solvent, such as trichloroethylene, and then coated onto the current collector. The resulting coating is preferably dried and densified after coating, and it consists primarily of iron disulfide (and its impurities); a binder to hold the particulate materials together and adhere the mixture to the current collector; one or more conductive materials such as metal, graphite and carbon black powders to provide improved electrical conductivity to the mixture; and various processing or rheological aids, such as fumed silica and/or an overbased calcium sulfonate complex. A preferred cathode formulation is disclosed in U.S. Patent Publication 20090104520, which is incorporated by reference.

Additionally, it has been determined that lithium-iron disulfide batteries intended for high rate applications inure benefits by providing an excess of theoretical interfacial input capacity in the cathode as compared to the theoretical interfacial input capacity of the anode associated therewith, as described in U.S. Pat. No. 7,157,185 which is incorporated by reference herein. Thus, in one embodiment, cells of the invention have an interfacial anode to cathode input ratio of less than 1.00, less than 0.95 or less than 0.90.

The following are representative materials utilized in the preferred cathode formulation. between 94 wt. % to 99 wt. % pyrite, 0.1-3.0 wt. % conductor, about 0.1-3.0 wt. % binder, and about 0-1.0 wt. % processing aids. It is more desirable to have a cathode mixture with about 95-98 wt. % pyrite, about 0.5-2.0 wt. % conductor, about 0.5-2.0 wt. % binder, and about 0.1-0.5 wt. % processing aids. It is even more desirable to have a cathode mixture with about 96-97 wt. % pyrite, about 1.0-2.0 wt. % conductor, about 1.0-1.5 wt. % binder, and about 0.3-0.5 wt. % processing aids. The conductor may comprise carbon black from Superior Graphite Chicago, Ill. and/or Timcal Westlake, Ohio. The binder/processing aids may comprise a polymeric binder comprising a styrene-ethylene/butylenes-styrene (SEBS) block copolymer, such as g1651 from Kraton Polymers Houston, Tex., and EFKA® 6950 overbased calcium sulfonate complex previously available from Ciba, Heerenveen, Netherlands or AEROSIL® 200 fumed silica from Evonik Industries AG, Essen, Germany.

It is also desirable to use cathode materials with small particle sizes to minimize the risk of puncturing the separator and/or to improve rate performance under certain conditions. For example, $FeS_2$ can be sieved, at least through a 230 mesh (62 μm) screen or smaller. More preferably, the $FeS_2$ may be media milled to have an average d50 particle size than 10 μm or less or processed, as described in U.S. Patent Publication No. 20050233214, which is incorporated by reference herein.

The cathode mixture is applied to the foil collector using any number of suitable processes, such as three roll reverse, comma coating or slot die coating. A mass-free zone on one or, more preferably, both sides of the cathode current collector can be incorporated into the coating process in order to facilitate electrical connection (either welded or pressure contact) along the top edge of the cathode, which effectively corresponds to a lengthwise uncoated portion along the top edge of each cathode. After or concurrent with drying to remove any unwanted solvents, the resulting cathode strip is densified via calendering or the like to further compact the entire positive electrode. In light of the fact that this strip will then be spirally wound with separator and a similarly (but not necessarily identically) sized anode strip to form a jellyroll electrode assembly, this densification maximizes loading of electrochemical material in the jellyroll electrode assembly. Particular advantages have been demonstrated in one embodiment of the invention when the cathode loading exceeds at least 28 mg of mix/$cm^2$ on one facing (i.e., one side) of the current collector.

However, the cathode cannot be over-densified as some internal cathode voids are needed to allow for expansion of the iron disulfide during discharge and wetting of the iron disulfide by the organic electrolyte. More practically, there are also operational limits as to the amount of force that can be applied to compact the coatings to high densities, and the stress on the current collector created by such forces can result in unwanted stretching and/or actual de-lamination of the coating. Therefore, it is preferable that the solids packing percentage in the final densified cathode must be sufficient to allow for the electrochemical reaction to proceed. Preferably, the final solids packing is between about 58% and 70%, although higher packing percentages may be possible.

In a fixed space, such as an FR6 can, the thickness of the electrodes impacts the amount of interfacial surface area, with thicker electrodes resulting in fewer winds within the jellyroll. Additional processing and manufacturing difficulties may also occur; for example, the cathode mix formulation, coating and densification operations will all be impacted as the cathode thickness increases, as will the subsequent jellyroll winding when either or both of the electrode thicknesses changes. Consequently, it may be desirable to maintain a jellyroll interfacial area of about 185 to 220 $cm^2$ in an FR6 cell, which corresponds to an anode thickness between 140 and 180 microns, a separator thickness between 16 to 25 microns and a cathode thickness between 180 and 220 microns (inclusive of the current collector). However, alternative lower or higher interfacial surface area designs are possible by varying the component thicknesses and/or winding conditions (e.g., mandrel size, void space, etc.).

When sets of prior art, spirally wound lithium-iron disulfide batteries selected from the same population and having substantially identical cell designs, electrode and electrolyte formulations are discharged, the batteries often exhibit variable performance on intermittent drain rate tests. This variability is particularly pronounced and noticeable in batteries wherein the outermost wind of the jellyroll includes more cathode than anode. Such cells are described as having a "cathode outer wrap" cell design, and but for the variability they experience on intermittent tests, such cathode outer wrap designs would be considered advantageous owing to their more efficient utilization of lithium in comparison to an "anode outer wrap" counterparts (i.e., those where the outermost electrode along the circumference of the jellyroll is primarily or exclusively anode).

Figure 2A:
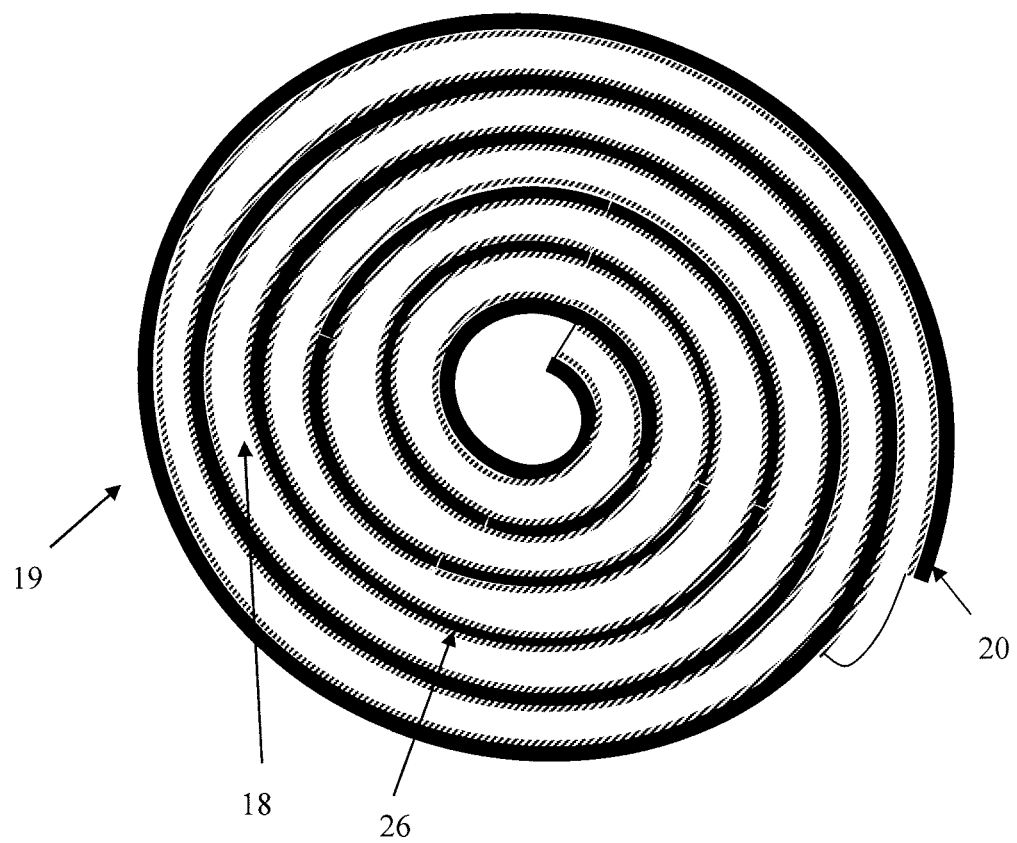
FIGS. 2A and 2B illustrate radial cross sections of a jellyroll electrode assembly, with FIG. 2A showing a cathode outer wrap design and FIG. 2B showing an anode outer wrap jellyroll configurations.
Figure 2B:
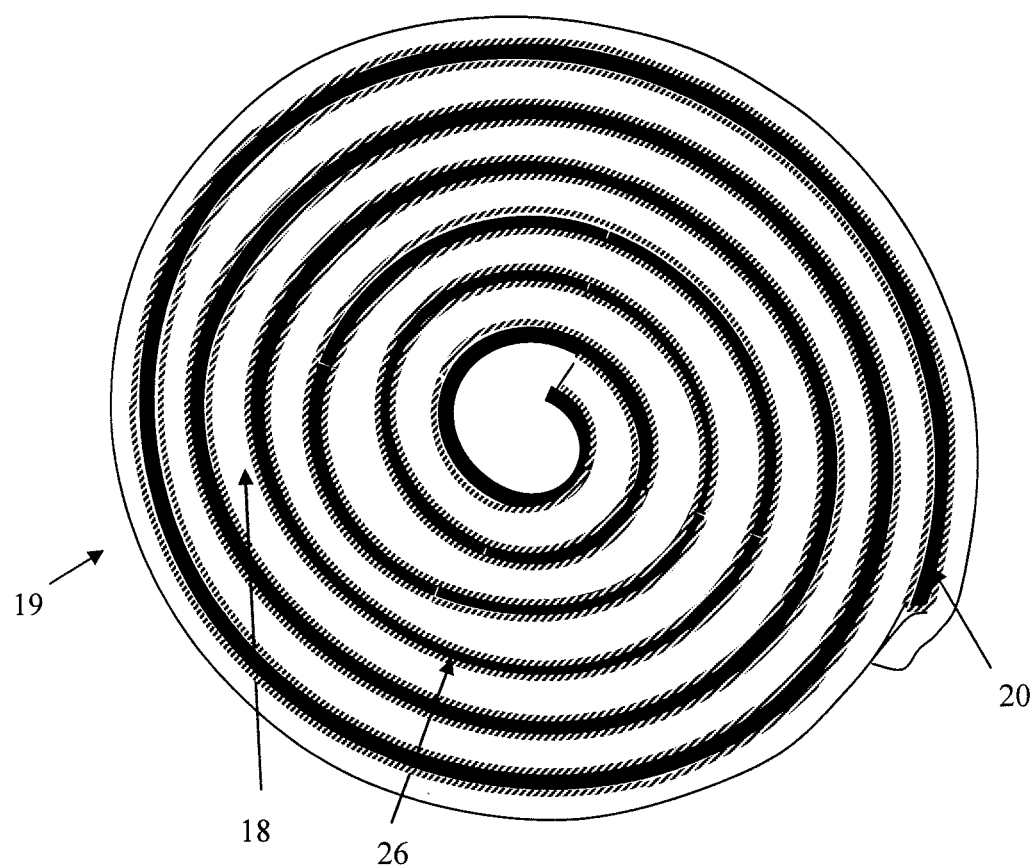

An example of a cathode outer wrap cell design is illustrated in a cross sectional view, i.e., taken along a radius of the jellyroll 19, in FIG. 2A, while FIG. 2B shows an anode outer wrap design. In both of these Figures, the cathode 20 is shown in black and the anode 18 in white with separator 26 illustrated as a broken line. The remaining elements of the cell (as described below) are omitted to better illustrate the difference in design. As used herein, a cathode outer wrap design and cell includes any jellyroll electrode assembly wherein a portion of the surface area on the outermost circumference of active material in the jellyroll is attributable to the cathode, either by way of cathode coating or, in situations where "patterned" coating is utilized, exposed cathode current collector (or where less than 50% of the outermost circumference is attributed to the anode). An anode outer wrap cell refers to an electrode assembly with more than 50% of its outermost circumference of active material is attributed to the anode, although in preferred embodiments substantially all of the outer-most active material will be anode. In identifying whether the cell is anode outer wrap or cathode outer wrap, any separator, leads, insulating tape and other inactive component(s) are not considered and the interfacial orientation of the electrodes is not accounted for. Instead, the outermost circumference of the jellyroll is assessed solely on the basis of the outermost portions of anode and cathode that are or would be exposed. Also, as used herein, a lead is considered a separate component as compared to a current collector, insofar as a lead establishes electrical contact between the electrode assembly and the terminal of the battery, while a current collector is used only within the electrode assembly itself (e.g., a current collector conducts electrons to the lead).

In either case (i.e., anode or cathode outer wrap design), the electrodes, and particularly the anode, have a substantially uniform thickness because of its ease of manufacture and the fact that this arrangement maintains the lowest possible internal resistance throughout the discharge of that cell. The cathode coating applied to a single side of the current collector also has a uniform thickness, although intermittent coating techniques may be employed to optimize active material volume and improve cathode utilization. Variable thickness electrodes are not considered desirable, at least with respect to lithium-iron disulfide spirally wound batteries, because of increased internal resistance caused by changes to the total interfacial surface area during discharge and/or the increased the complexity of the design and manufacture of variable thickness electrode cell designs. In fact, the inventor is unaware of any commercially available or viable FR6 or FR03 cells which utilize this type of variable thickness design.

Figure 2C:
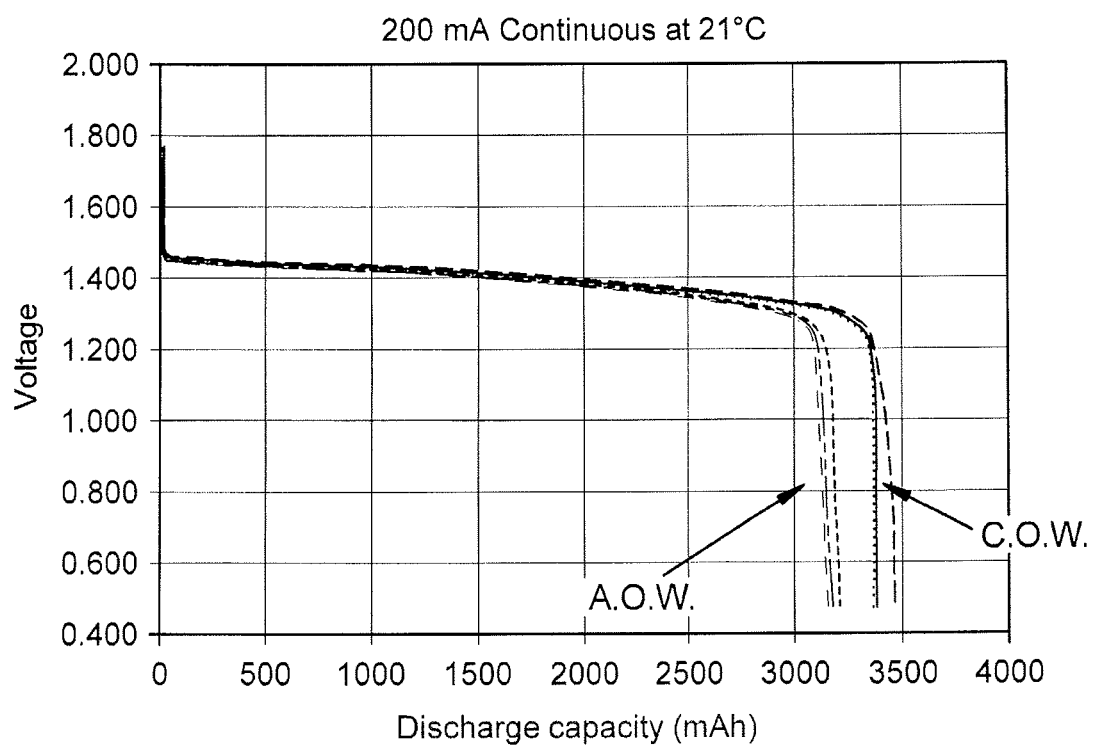
FIG. 2C compares discharge profiles for prior art anode outer wrap and cathode outer wrap lithium-iron disulfide cell designs on a continuous discharge test.

As seen in FIG. 2C, cells with an anode outer wrap (A.O.W.) have less discharge capacity than corresponding cathode outer wrap (C.O.W.) cells on the 200 mA continuous drain rate test. In addition to this performance benefit on continuous drain tests, cathode outer wrap designs more effectively utilize the lithium, which is more economical (because lithium is one of the most expensive components in an FR6 cell) and environmentally beneficial (because less overall lithium is left in discharged cell).

However, as will be discussed in greater detail below, the inherent advantages of cathode wrap cells are not observed when the batteries are subjected to intermittent drain rate tests. Such intermittent drain rate tests are considered extremely pertinent because they most closely simulate the actual usage of batteries by consumers in most electronic devices (i.e., consumers often use devices intermittently over a long period of time, rather than continuously). The failure of a battery design to perform consistently on intermittent tests in a manner that meets or exceeds the performance of an anode outer wrap cell design has been a considerable disincentive for widespread adoption of cathode outer wrap cell designs. As a result, anode outer wrap for FR6 and FR03 cells are the predominant and most widely available cell design on the market today.

Figure 3A:
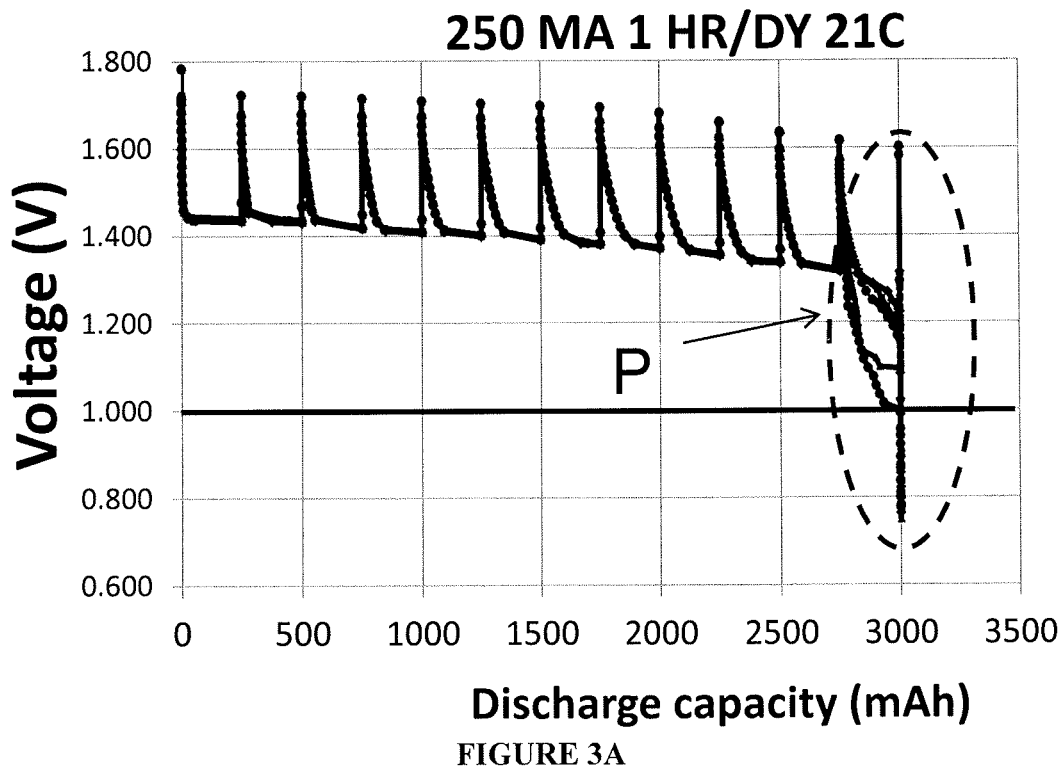
FIGS. 3A, 3B, 4A, 4B, 5A, 5B and 5C illustrate discharge profiles for various prior art lithium-iron disulfide cell designs on a variety of intermittent discharge tests.
Figure 3B:
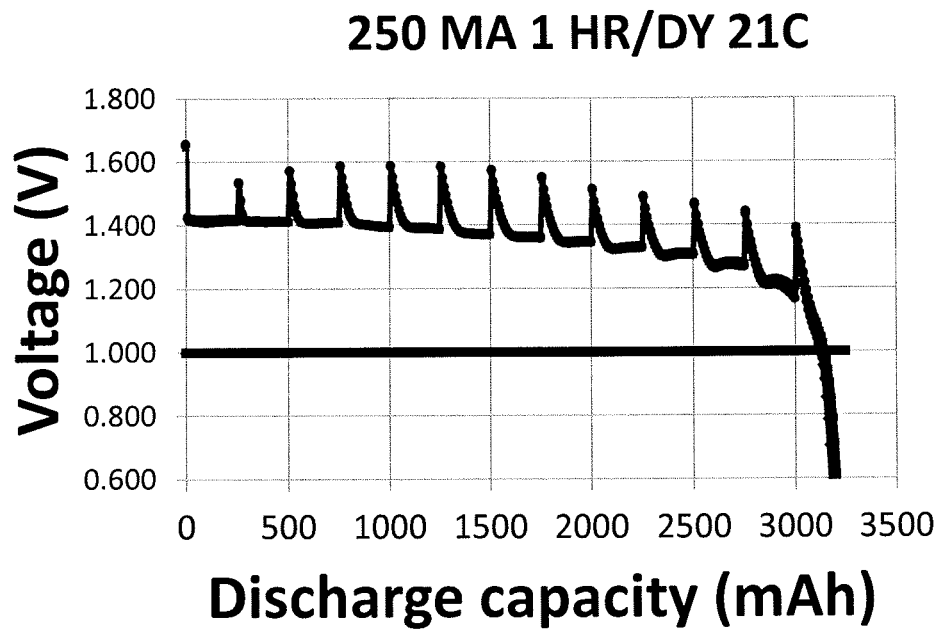
Figure 5A:
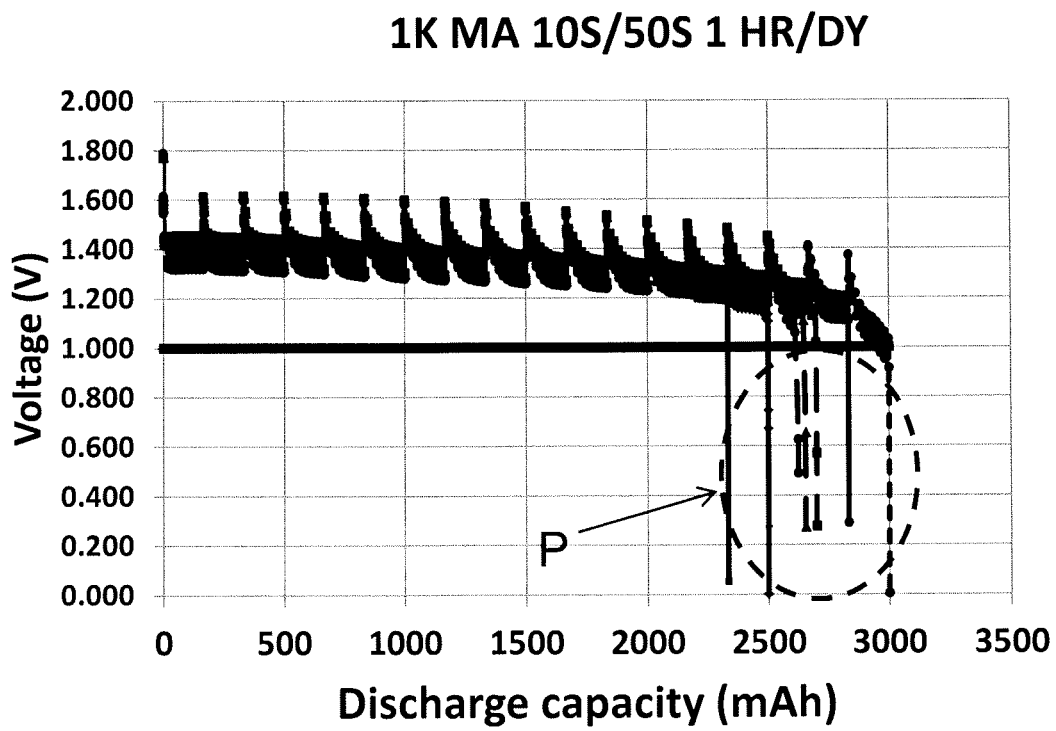
Figure 5B:
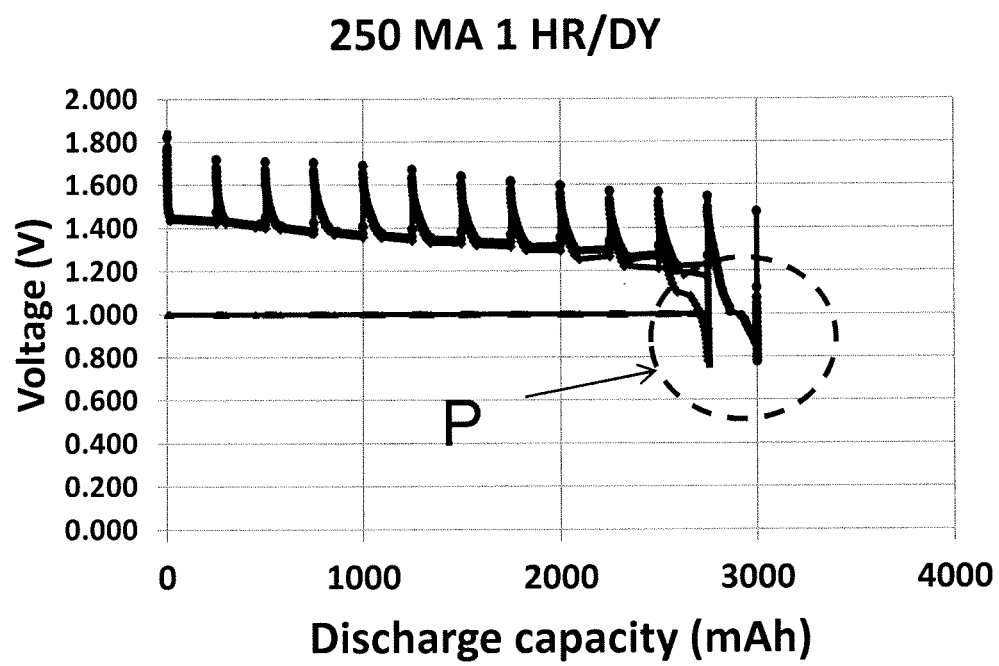
Figure 5C:
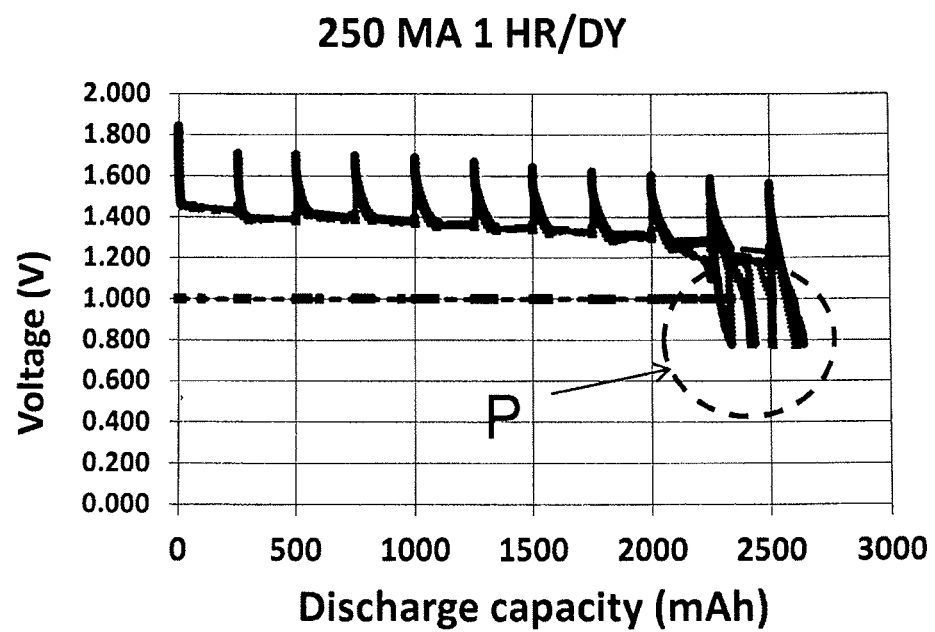

FIG. 3A shows the voltage discharge curves on an intermittent test for a series of FR6 cells having a cathode outer wrap. This particular intermittent test involved a constant current discharge of 250 mA for one hour, followed by a 23 hour rest interval, conducted to a 1.0 voltage cutoff. As highlighted by reference element P, the individual voltage profiles for these cells diverge at the end of this intermittent test. This behavior—wherein a population of cells delivers variable and decreased capacity (in comparison to expectations)—is collectively referred to hereafter as "premature voltage drop-off." Significantly, anode outer wrap cells, having identical materials, do not experience premature voltage drop-off on any tests, as seen by the 250 mA 1 hr/day comparative profile shown in FIG. 3B. The premature voltage drop-off in cathode outer wrap cells was even more pronounced for the intermittent test shown in FIG. 4A (showing the cathode outer wrap) and 4B (showing the anode outer wrap), where the cells were discharged for one hour per day at a cycle of 10 seconds of a 1 A discharge followed by 50 seconds of rest (note that the remaining 23 hours were also a rest interval) to a 1.0 cutoff voltage. A number of prior art, commercially available FR6 batteries having a cathode outer wrap design also exhibited this behavior, as evidenced by problem area P illustrated in FIG. 5A (showing an intermittent test identical to that described for the cells of FIGS. 4A and 4B) and in FIGS. 5B and 5C (showing an intermittent test identical to that described for the cells of FIGS. 3A and 3B). Insofar as the ultimate goal of a battery manufacturer—and the ultimate indicator of quality for any cell design—is consistency and reliability for all batteries produced according to a single design, premature voltage drop-off has limited the utility of cathode outer wrap designs for lithium-iron disulfide cells.

This premature voltage drop-off is inherently comparative. In order to establish a premature voltage drop-off, the voltage discharge curves for a plurality of presumably identical cells should be compared. At least four cells should be subjected to the intermittent tests described herein in order to confirm the observed effect. More preferably the performance of a set more than 6 to 10 individual cells should be compared relative to one another. Most preferably, because premature voltage drop-off may manifest itself only a parts per thousand basis, the maximum number of batteries that are feasible should be tested and compared.

An observed variation of greater than 7 to 10%, or more definitively greater than a 11 to 15% and most definitively between 16 to 20%, in two cells from the population indicates a premature voltage drop-off problem for that cell design. In performing this analysis, care should be taken to maintain identical conditions (e.g., ambient temperature, drain rate, intermittency (if any), final cutoff voltage, testing equipment used, etc.), as well as confirming that the population of cells all have the same cell design and initial performance characteristics (e.g., electrolyte, cathode loading, lithium thickness, open circuit voltage, etc.).

In the event an insufficient population of cells are available or the aforementioned comparative testing is inconclusive, premature voltage drop-off may be identified by comparing the lithium utilization within a population of similarly constructed and discharged cells. Significant differences (e.g., 5%, 10% or 20%) in the mass of lithium remaining within a set period of time after discharge may be indicative of premature voltage drop-off. Still another indicator of the premature voltage drop-off is a simple, qualitative comparison of the shape of the individual discharge curves themselves, insofar as cells experiencing premature voltage drop off tend to display erratic or inconsistent profiles, especially toward the end of the battery's life (as seen in FIGS. 3A through 5C).

Lastly, in a single cell, an actual delivered capacity on an intermittent drain test that is significantly less than the manufacturer's stated capacity (e.g., about 10%) can be evidence of the premature voltage drop-off problem.

A previous solution for premature voltage drop-off was proposed in U.S. patent application Ser. No. 12/904,447, which was filed on Oct. 14, 2010 and is commonly assigned to the assignee of this invention. Here, a small lithium patch was proposed to increase the thickness of the anode along a narrow longitudinal axis underneath the terminal end of the cathode. A similar approach has been proposed for rechargeable batteries, as seen in United States Patent Publication 2010/0255357, where a conductive tape is affixed to a bare portion of the anode current collector along the outside of the jellyroll (to eliminate the need for internal welding) and an elastic member is affixed to the inner-facing side of the anode current collector (to match the thickness of the anode material along this inner-facing surface, thereby eliminating the potential for short-circuiting as this rechargeable battery repeatedly expands and contracts during charge cycling). Notably, the solution proposed in the aforementioned patent publication necessitates affixing the tape and elastic member to an uncoated portion outer-most circumference of the jellyroll that is outside of the interfacial region in which electrochemical reactions occur.

The inventors have now determined the terminal end of the cathode creates a localized region of increased electrochemical activity. In particular, the cathode outer wrap cell design includes an outer circumference of cathode is not interfacially aligned with anode. Thus, at the terminal end of the cathode outer wrap, lithium ions move around the terminal edge and undergo reactions with the outer-most cathode coating, thereby creating an "edge effect" where a region of increased electrochemical activity all along the longitudinal axis of the interface between the anode and the cathode's terminal edge. When cells have an under-balance of anode (as is preferred in FR6 and FR03 batteries), this edge effect can and will cause the anode to completely disappear along the axis, leading to an anode disconnect under intermittent load conditions. In contrast, anode outer wrap cell designs do not experience this problem because substantially all of the cathode is interfacially aligned, particularly in relation to the location of the anode lead.

Because a full-length anode current collector is not used in the anode in lithium-iron disulfide batteries in order to maximize discharge capacity, severing the anode at any point isolates the severed material from the anode tab/negative terminal, thereby eliminating the capacity normally anticipated from the severed portion. In turn, because radial expansion issues dictate the preferred position of the anode tab/lead is at the tail end of the anode on the outer-most circumference of the jellyroll, an anode disconnect anywhere else within the jellyroll will lead to an immediate and permanent drop in capacity, consistent with FIGS. 3A through 5C.

Simply masking or covering the cathode material along the inner-facing terminal edge of a cathode outer wrap cell is insufficient because of the porosity of the cathode itself. That is, an insulating layer disposed only on the surface of the cathode does not prevent lithium ions from entering the porous cathode at the uncovered edge interface between the anode and the masking material and then diffusing underneath the masking material to react with the covered cathode via the cathode pores. In this case, unwanted localized region of increased electrochemical activity are still created along the interface between the anode and the edge of the masking material on the cathode's surface, resulting in anode disconnects even when the actual terminal edge of the cathode is covered on the surface.

When the premature voltage drop-off problem is understood in this manner, it is apparent that the aforementioned "lithium patch" solution works by creating a localized anode over-balance at the region where the disconnect would otherwise occur. This extra anode material maintains the integrity of the electrical connection between the anode and the anode lead/tab. However, the pliable and adhesive nature of lithium makes implementation of a lithium patch at a manufacturing scale untenable, and the patch itself will create additional raw materials costs. Also, the variation in anode thickness caused by the lithium patch entails the other difficulties with the manufacturing of a jellyroll as noted above.

Without intending to be bound by their theories of the invention, the inventors now believe, by manipulating the distance lithium ions must travel in order to react with cathode on the outer-most side of the cathode near the terminal edge of a double-sided cathode, the edge effect is eliminated and it becomes possible to control and prevent anode disconnects in cathode outer wrap cell designs. Elimination of the edge effect may be accomplished in any number of ways, as will be discussed at greater length below. Both the end-product apparatus and the methods for making and using cells incorporating the features discussed below are expressly contemplated herein.

In one embodiment, a gap is created between the terminal edge of the cathode and the anode through the use of a spacer positioned between the electrodes at the terminal edge on the outer wrap of the jellyroll. The spacer comprises any low cost insert exhibiting sufficient elasticity, although an elastomeric strip is preferred. In particular, the spacer should have sufficient pliability and hardness to withstand the radial expansion forces exerted by the discharging cathode, while also displaying appropriate chemical and electrochemical compatibility with the battery components. Specific material compositions would include any material previously identified herein as appropriate for the separator (both microporous and non-porous), gasket, vent or seal components, along with other classes of natural rubbers, styrene butadiene rubbers, butadiene, butyl rubbers, ethylene propylene type rubbers (e.g., EPDM), nitrile, neoprenes, urethanes, silicon rubbers, fluorinated hydrocarbons and fluoroelastomers.

The elastomeric nature of the spacer will eliminate stack pressure along the longitudinal axis at the terminal edge of the cathode throughout the discharge life of the battery. This loss of stack pressure effectively creates a sufficient physical gap to prevent any corresponding electrochemical reactions in the zone along that axis when the battery is first placed under a load. Furthermore, as the cell discharges, the absence of electrochemical reactions in this zone prevents cathode expansion so that the electrodes continue to experience a lack of stack pressure throughout cell discharge in that localized zone. Additionally, the elastic nature of the spacer absorbs radial expansion from the other parts of the jellyroll while maintaining still a gap between the electrodes, thereby relieving stack pressure and maintaining the gap integrity along the non-reactive zone throughout the entire discharge of the battery.

The particular dimensions of the spacer will be dictated by the cell size, with the length and width of the spacer corresponding to the length and width of the anode. The thickness of the spacer is of greater importance than its width, and thickness can be viewed as a function of the corresponding thickness and loading of the electrodes on either side of the spacer. For example, in a cell having a 195 micron thick cathode (inclusive of the coating and the current collector)

and a 175 micron anode, the optimal spacer may have a thickness of 500 to 825 microns, including spacer thicknesses of 600, 650, 700, 750 and 800 microns. Alternatively, the spacer thickness can be expressed as a function of the cathode thickness, with the spacer ideally having a thickness that is at least 2, 2.5 or 3 times the thickness of the entire cathode (inclusive of the coating and the current collector). Conversely, the spacer thickness should be no more than 4.5, 4.25, 4.0 or 3.5 times the thickness of the cathode. Spacer thickness could be expressed as a function of the overall thickness of the electrode stack (inclusive of the separator thickness), with spacer thickness being between 1.25 and 2.05 times the thickness of the electrode stack, or between 1.40 and 1.90 or between 1.50 and 1.80 times the thickness of the electrode stack. These stated dimensions consider the spacer as a discrete component, prior to its inclusion in the wound assembly.

The hardness of the spacer is one measure of the elastic elastomeric properties of the spacer. Preferably, the spacer will exhibit a hardness of between 40 to 60 durometers. If the spacer has a hardness rating in excess of 80 durometers, the spacer may not possess sufficient flexibility when exposed to the radial expansion of a discharging jellyroll, which can lead to unwanted interactions between the jellyroll and the spacer. If the spacer is too hard, the spacer may also create a pinch point along with the electrodes and/or separator can be compromised or even severed owing to the pressure created by radial expansion. Conversely, the spacer should possess sufficient flexibility to allow for its insertion and winding within the jellyroll.

The selection of the electrolyte and the absorption of that electrolyte by the spacer may influence the design of the spacer. For example, a thicker spacer may be required if the cell utilizes a relatively high conductivity non-aqueous electrolyte (which are all still much less conductive than aqueous alkaline electrolytes, serving as further example as to why comparisons and teachings between different electrochemical systems can be inapposite). In the same manner, a spacer material that is impervious to the absorption of electrolyte may provide a more defined non-reactive gap.

While the spacer is most efficiently provided as a single, unitary strip, it may also be possible to impart the same desire effect through the use of a plurality of smaller members applied along a common axis. Alternatively, the spacer may comprise a series of thin strips that are stacked on top of one another. In either instance, the ultimate goal is insure the requisite thickness of the spacer is attained.

Figure 6A:
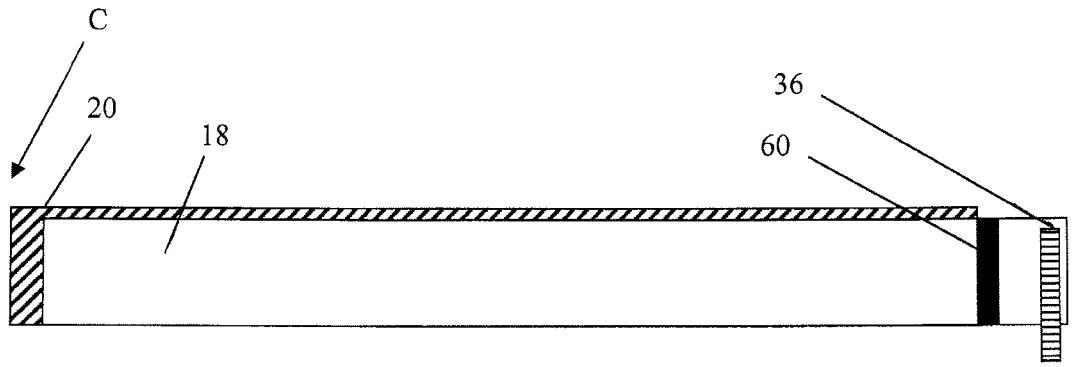
FIG. 6A illustrates a preferred location for the elastomeric spacer relative to the anode and cathode elements prior to winding, as contemplated in one embodiment of the invention.

FIG. 6A illustrates the positioning of the spacer 60 relative to the anode 18 and cathode 20 when the electrodes are positioned in their unwound state. Preferably, the spacer is positioned immediately adjacent to or underneath the terminal edge of the cathode. As noted above, anode tab or lead 36 is positioned to be on the outer-most wind of the resulting jellyroll electrode assembly when the electrodes and separator (not shown in FIG. 6A) are wound around core end C.

In another embodiment, the edge effect is eliminated by continuously coating both sides of the solid foil cathode current collector, as described above, and then substantially reducing, or more preferably eliminating, the electrochemical reactivity on one side of the cathode in an longitudinal strip near the terminal edge of the cathode in the outer circumference of the jellyroll electrode assembly. The side having the eliminated reactivity is then preferably oriented on the outside of the jellyroll when the electrodes are wound into a jellyroll electrode assembly to allow for maximum lithium utilization.

The reactivity of the cathode may be eliminated in a number of ways. In one embodiment, the cathode may be physically removed from the current collector, resulting in a mass free zone across the width of the cathode (and in contrast to/distinct from the mass free zone that may optionally be implemented along the length of the cathode to establish electrically connectivity with the cell terminal, as described above). Preferably, this removal is accomplished as a separate step from the continuous coating operation so as to allow for high speed manufacturing of the double-side coated cathode. The physical removal may be achieved by scraping the coated mixture off of the current collector or according to other mechanical, ultrasonic, chemical or electro-mechanical means. Alternatively, a sacrificial substrate may be applied to the collector prior to continuous coating, after which the sacrificial substrate is removed, thereby leaving a small empty longitudinal strip on the cathode. The cathode stock is then cut so as to leave the eliminated reactivity zone on a terminal edge.

In another embodiment, the physical removal of cathode mix step may be performed concurrently with the cutting of the cathode stock. In a final embodiment of this mass free zone concept, the cathode may be continuously coated in as a number of distinct bands, with the individual cathodes then being cut so that the uncoated bands serve as the mass free zone (with cathode being coated all the way to the top and bottom axial edges/along the entire length of the cathode). Any of the aforementioned physical removal steps possesses numerous advantages over intermittent "pattern cathode" coating techniques, including faster processing speed (continuous coating can proceed at twice the speed of intermittent coating) and less complex manufacturing methods (in that the cutting of the cathode stock may not need to be as precisely aligned to conform to the intermittent pattern).

Another means of eliminating the reactivity of the cathode is through the use of substance which effectively blocks or insulates the cathode mixture from ionic conductivity and/or electrochemical reactivity along the aforementioned longitudinal strip near the outer-most terminal edge of the cathode. In one embodiment, this insulation may be accomplished by infusing and at least partially blocking the coated cathode pores with an appropriate material, such as a polymeric material, to prevent ingress and egress of reactants through the cathode pores. The insulating material may be coated or printed onto the cathode stock, which is subsequently cut so that the longitudinal strip is aligned as described above. In another embodiment, it may be possible to discharge the cathode mixture in the desired location in order to replace active material in the strip with the end reaction products. This discharging operation could be integrated into existing manufacturing processes; for example, as part of the operation to cut the mass cathode stock. In yet another embodiment, components may be introduced into the cathode mixture which cause or facilitate de-lamination at the desired cathode location. These components may be included in the cathode mixture prior to coating or can be screen printed or coated at intervals along the current collector or coated cathode prior or subsequent to cutting. Similarly, components known to cause polymerization or other type of chemical reaction can be employed to effectively insulate or block the cathode pores, thereby preventing electrolyte or lithium ion ingress or egress at the desired location. In the event delamination, polymerization or other coating removal is desired, components in the coated cathode mixture may produce the desired effect(s) when that location is exposed to an initiator. The initiator may be of a chemical or physical nature, including heat, radiation, electromagnetism, sonic or ultrasonic stimulus, chemical catalysis and/or light (e.g., laser light, UV light, IR light, etc.), thereby inducing or facilitating the desired reduction/elimination of electrochemical reactivity only in the desired location. These approaches could be implemented in combination with any of the other techniques described herein.

Yet another means of eliminating the reactivity of the cathode is to reduce the cathode loading along the aforementioned longitudinal strip to such a point that a localized region of cathode under-balance is achieved in that region when the electrodes are wound together. In this case, the continuous coating operation can be periodically varied so that less cathode is coated onto a single side at the desired longitudinal location. For example, the speed at which the current collector substrate passes through the coater may be periodically increased for a brief moment to create a localized portion of reduced cathode loading, and the subsequent cutting of the cathode is aligned so that the reduced portion coincides with the outer-most terminal edge of the cathode. Depending upon the coating process and/or arrangement of the manufacturing line, this variation in speed coating speed to reduce cathode loading may be performed on one or both sides of the current collector. Alternatively, it may be possible to reduce the cathode capacity by deliberately introducing (possibly by way of a subsequent printing or coating step) a retardant that increases resistance and/or reduces the actual delivered cathode capacity in that region. This method of altering the cathode loading and/or capacity along the length of the final, cut cathode is in contrast to the aforementioned "lithium patch" solution (i.e., the former creates a cathode with varying capacity/loading along its length, while the later creates an anode with varying capacity along its length), and advantageously, the anode in the resulting jellyroll for this embodiment retains a homogenous character. This approach also allows for greater manufacturing tolerances in terms of the cutting and coating operations, especially to the extent that the zone of reduced loading/capacity oriented on the outer-most wind of cathode can vary from cell to cell, and can potentially occupy up to the entire outer circumference, without negatively impacting the cell's overall capacity or performance comparative to the entire population made according to this method. As above, this embodiment may be combined with any of the other techniques described herein. Notably, the underlying continuous coating operations, including the requisite cutting, aligning and winding of the cathode with the anode and separators, inherent to these methods are generally known within this field.

The mass free, insulating or reduced loading zones described above only need to occupy a small portion of the outer-most facing cathode wind. The ultimate size (i.e., width) of the zone will involve similar considerations as in the discussion of thickness required by the spacer embodiment above, that is any zone of 500 microns or greater is sufficient. In contrast, a zone/path length that is 220 microns or less does not appear to prevent premature voltage drop-off. Ultimately, the zone width will be related to the thickness and loading of the electrodes, along with the conductivity of the electrolyte and the overall size of the battery (e.g., AA vs. AAA, etc.). Preferred widths for the zone are at least 500 microns, at least 600 microns and at least 750 microns. The maximum width of the zone will be dictated by the desire to maximize active material in the cell and to maintain the aforementioned advantages of continuous coating in manufacturing processes, particularly in comparison to intermittent coating operations. In any event, the maximum width of the zone will be less than the outermost circumference of the jellyroll, and more preferably less than one half, one quarter or one tenth of the outer-most circumference. Alternatively, the maximum size of the region can be 30.0 mm, 15 mm or 3 mm. In each case, the stated dimensions are considered for the electrodes in a flat, linear orientation as they are created along the web (i.e., prior to winding).

Figure 6B:
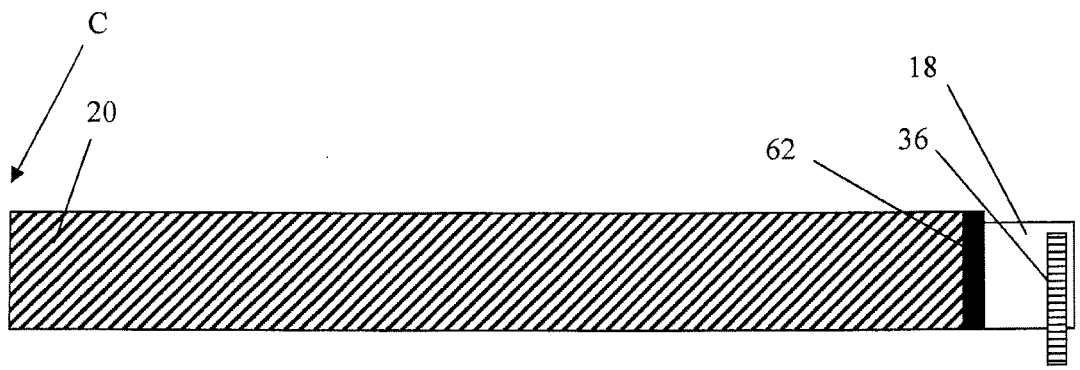
FIG. 6B illustrates a preferred location for the zone of reduced/eliminated electrochemical reactivity relative to the anode and cathode elements prior to winding, as contemplated in other embodiments of the invention.

FIG. 6B illustrates the positioning of the eliminated reactivity zone 62 relative to the anode 18 and cathode 20 when the electrodes are positioned in their unwound state. As noted above, anode tab or lead 36 is positioned to be on the outermost wind of the resulting jellyroll electrode assembly when the electrodes and separator (not shown in FIG. 6B) are wound around core end C. The eliminated reactivity zone 62 may be accomplished by way of a mass free zone, blocking the cathode pores or creating a localized reduction in cathode capacity (i.e., an anode over-balance), all as contemplated and described above.

In any of the embodiments, the cell will have an interfacial anode under-balance (i.e., where the electrochemical capacity of interfacially aligned anode and cathode are approximately equal or where there is less capacity in the anode), as such an interfacial anode under-balance is most closely associated with anode disconnects and provides for an unexpected increase in discharge capacity on both a volumetric and gravimetric basis. In calculating the balance of the cell, an interfacial anode-to-cathode input capacity ratio can be calculated on the basis of the theoretical capacity of the electrodes in their original, flat, linear orientation, as is disclosed in U.S. Pat. RE 41,886 (incorporated herein). An anode-to-cathode ratio of less than 1.1 is indicative of the potential for a localized anode under-balances (based upon inherent variation in manufacturing operations), while an anode-to-cathode ratio of less than or equal to 1.0 more definitively reflects an anode under-balance across the entire interfacial electrode surface in the electrode/jellyroll. An interfacial anode-to-cathode input capacity ratio of less than 0.95 may be most preferred for certain embodiments.

While the embodiments above are specifically envisioned to have utility with respect to lithium-iron disulfide batteries, the same underlying principles may find at least limited applicability to a select number of other primary lithium battery systems where the lithium anode has no current collector and the cathode is coated or pressed onto a current collector which is situated on the outer-most circumference of the spirally wound electrode assembly (i.e., a cathode outer wrap cell design). In particular, the cell design principles disclosed herein may be applied to lithium-manganese dioxide batteries. However, the foregoing caution against generically or universally applying teachings from one type of battery chemistry to another must still be heeded, and any further extension or application of the principles herein must be verified.

The invention will now be described with reference to the following non-limiting examples.

EXAMPLE 1

Figure 7A:
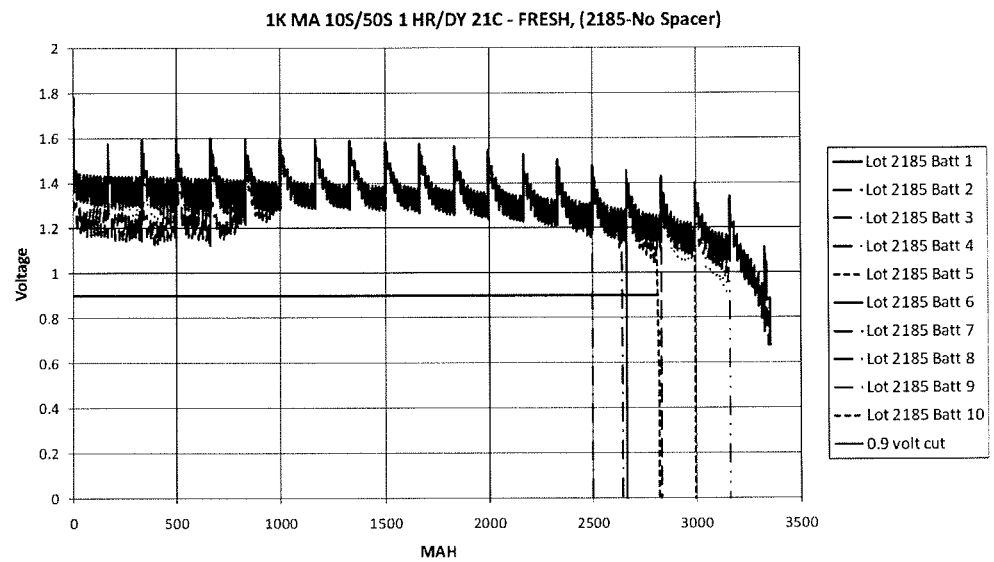
FIGS. 7A through 7D depict comparative discharge curves for the batteries described in Example 1 below.
Figure 7B:
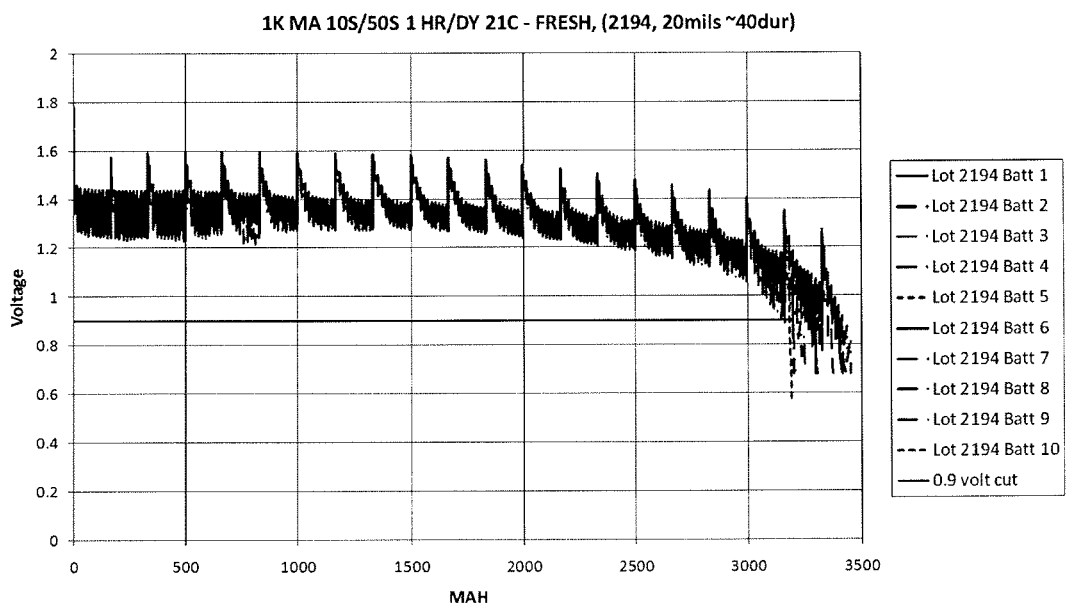
Figure 7C:
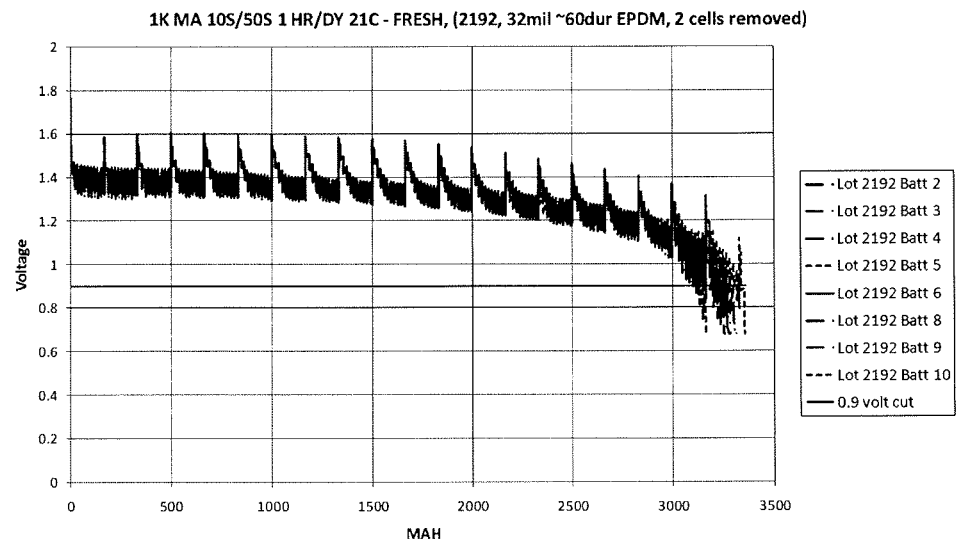
Figure 7D:
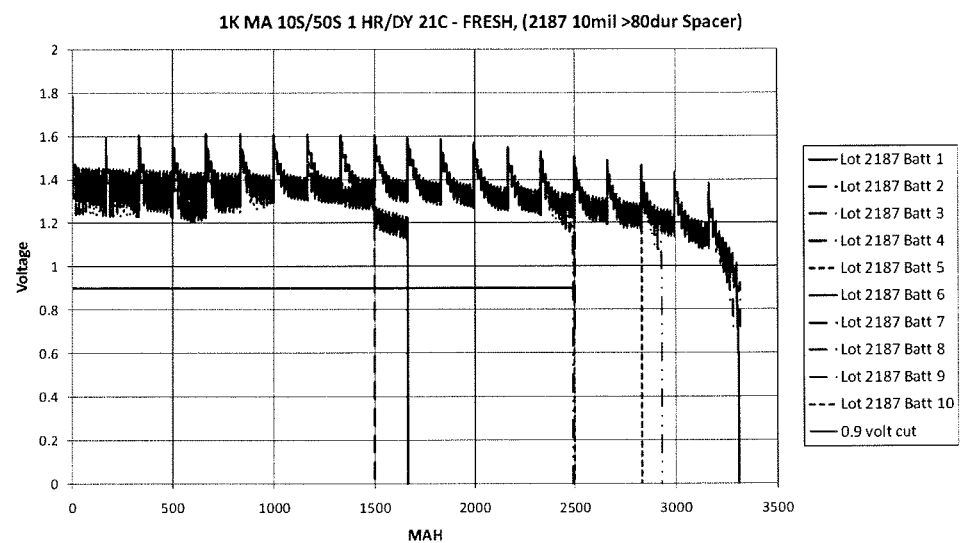

FIG. 7A illustrates the discharge profiles for a set of batteries with a cathode outer wrap cell design. The wide spread of discharge capacities (ranging from about 2500 mAh up to about 3300 mAh) is an indication of premature voltage drop-off. In contrast, FIG. 7B illustrates an identically constructed set of cells wherein a 508 micron, 40 durometer spacer is applied under the terminal edge of the outer-most cathode wrap. FIG. 7C illustrates identically constructed cells, but with an 812 micron, 60 durometer spacer. In the latter two cases, the incidence of premature voltage drop-off has been effectively eliminated, and the variability between individual cells within the population substantially reduced, without negatively impacting the overall discharge capacity. Significantly, use of a 250 micron, 80 durometer spacer actually increased the severity of premature voltage drop-off, as shown in FIG. 7D. Note that the cells in FIGS. 7A through 7D were discharged intermittently by applying a 1 A pulse for ten seconds of every minute for one hour a day at ambient (21° C.) temperature to a 0.9 volt cutoff (drawn in each Figure as a horizontal line extending from the y-axis across approximately two-thirds of the x-axis).

EXAMPLE 2

Figure 8A:
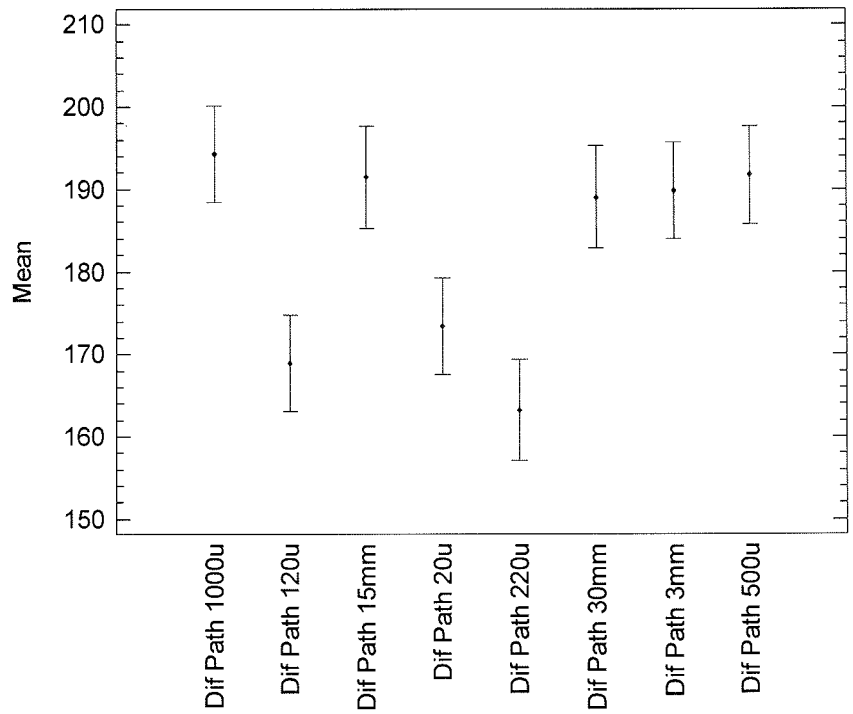
Figure 8B:
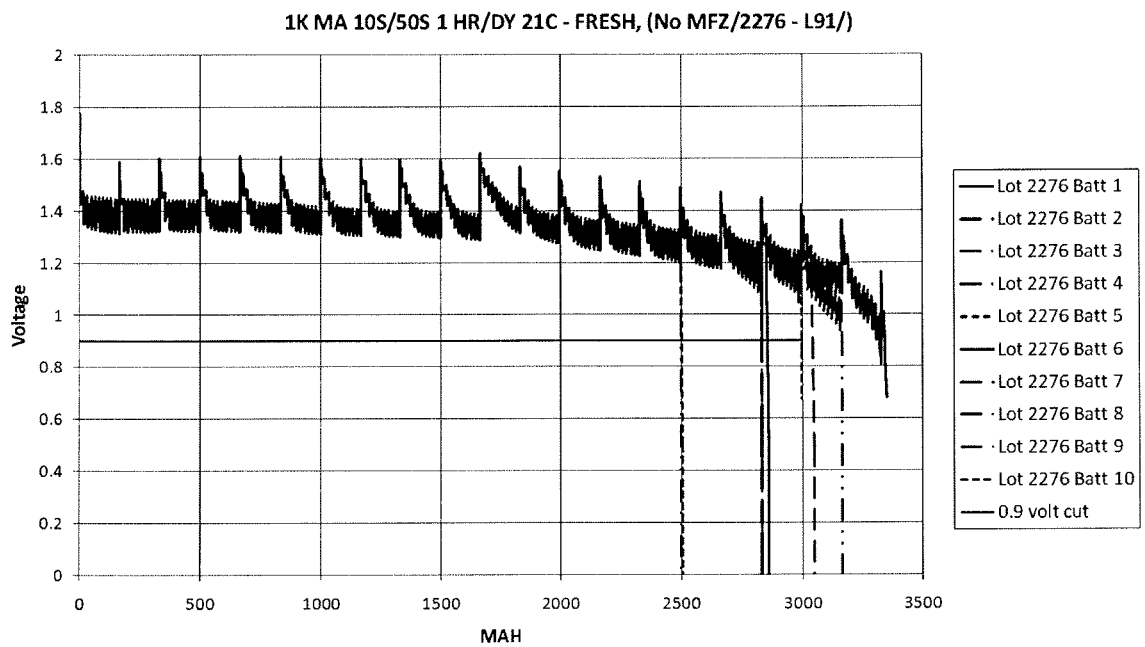
FIGS. 8B through 8D depict discharge curves for a selected number of those batteries.
Figure 8C:
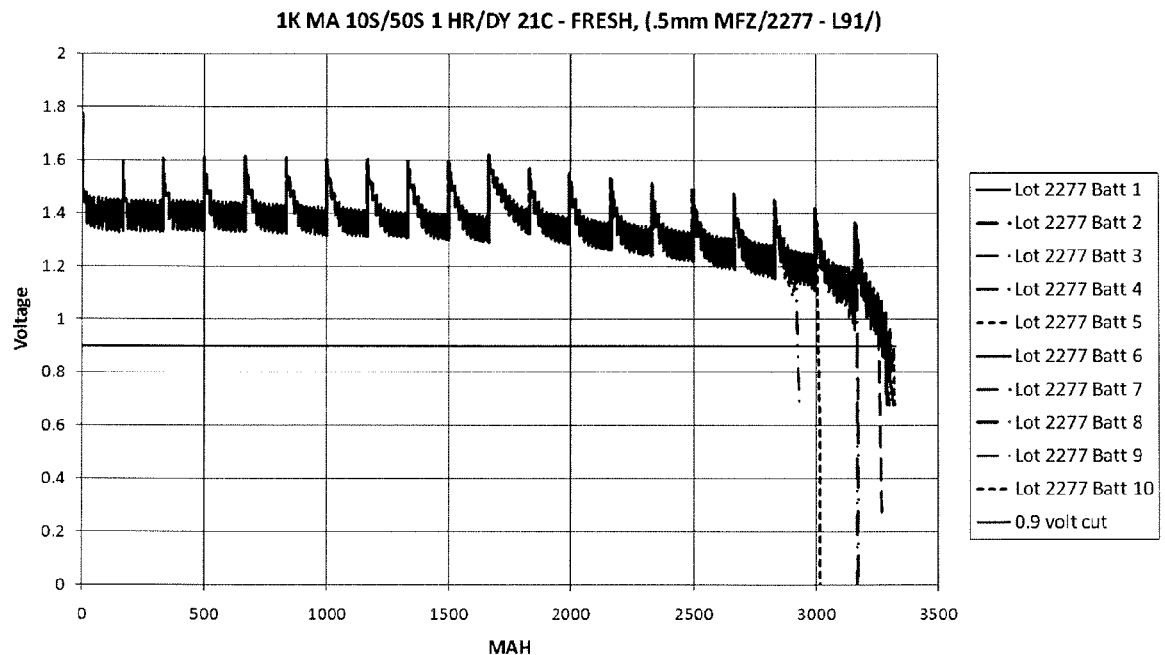
Figure 8D:
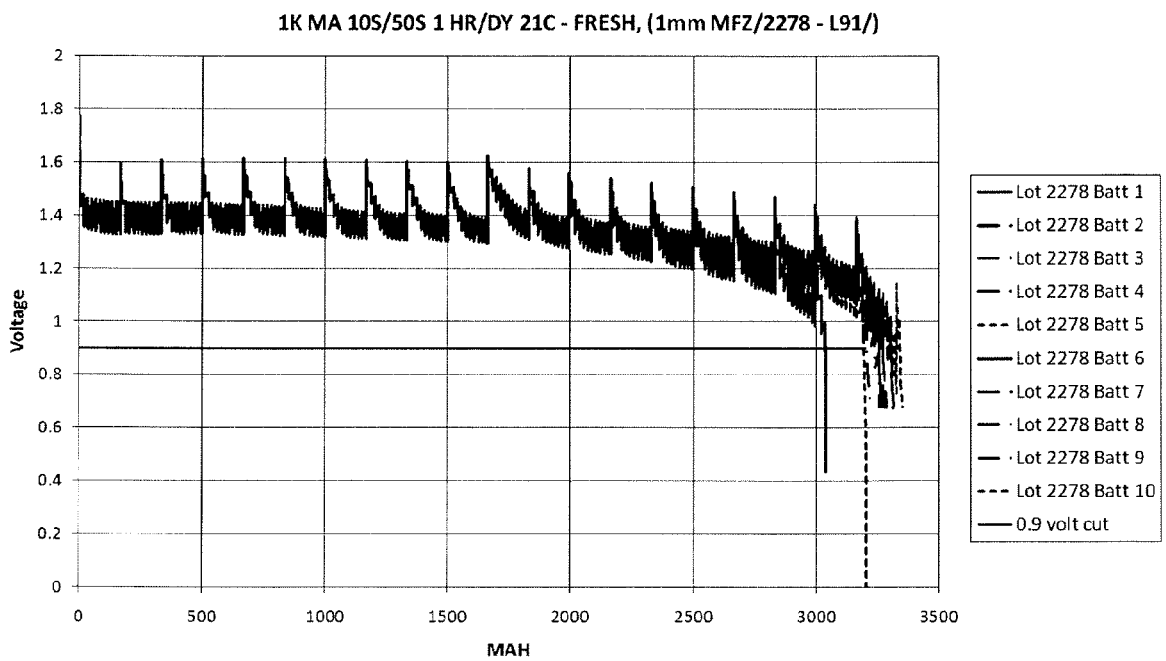

FIG. 8A illustrates the mean capacity for a set of at least 9 identically constructed cells discharged intermittently with a 1 A pulse for 10 seconds per minute for one hour per day to 0.9 volt cutoff, where the electrode gap (i.e., "dif path" as indicated along the x-axis) in each set was varied through the use of spacers or mass free zones. The mean is indicated by the midpoint for each data set, while the bars indicate the 95% confidence level for the data associated with that lot. Statistical analysis of the resulted demonstrated that the 20, 120 and 220 micron groups can be treated as a homogenous group which is, at the 95% confidence level, distinct from the homogenous group represented by the 0.500, 1.00, 3.00, 15.00 and 30.00 millimeter groups. The 20, 120 and 220 micron sets were created through the use of multiple layers of separator stacked at the terminal edge. The remaining groups were created by continuous coating followed by physical removal of the coating to the indicated widths. FIG. 8B displays the discharge performance for a set of cells constructed without any alterations (i.e., no mass free zone or spacer), and these cells were discharged intermittently as in FIG. 8A, with the best and worst performing cells in the population having anywhere from approximately 3300 mAh to 2500 mAh of capacity (a difference of over 20% relative to both the best performing cell, thereby qualifying as a premature voltage drop-off). FIGS. 8B and 8C show the discharge performance of the set of cells from FIG. 8A having a 0.500 mm and 1.00 mm wide mass free zones, wherein the premature voltage drop-off has been reduced and effectively eliminated.

With respect to the foregoing discussion, the amount of $FeS_2$ in the cathode coating can either be determined by analyzing the mixture prior to fabrication of the battery or by determining the iron content post-formulation and correlating the detected level of iron to the weight percentage of pyrite in the cathode. The method of testing for iron content post-fabrication can be conducted by dissolving a known amount (in terms of mass and volume/area) of cathode in acid, then testing for the total amount of iron in that dissolved sample using common quantitative analytical techniques, such as inductively coupled plasma atomic emission spectroscopy or atomic absorption spectroscopy. Testing of known coated cathode formulations according to this method have verified that the total amount of iron is representative of $FeS_2$ in the cell (particularly to the extent that is desirable to maximize the purity of $FeS_2$ in the cathode coating). It may also be possible to determine cathode density using a pycnometer, although certain binders may experience volumetric changes when exposed to the internal environment of a lithium-iron disulfide cell such that the density established by such methods may need to be adjusted further in order to arrive at the cathode dry mix density. All of these characteristics can be employed to determine the interfacial input capacity for purposes of establishing an anode under-balance in the cell.

Notably, testing for the quantity of aluminum in the sample will allow for calculation of the thickness of the current collector (when the collector is aluminum) in a similar manner (e.g., ICP-AES or AA spectroscopy). Other similar analytical techniques may be employed to test for binders, processing aids and the like, depending upon the atomic and/or molecular composition of those components, and analysis of the anode and/or separator is possible using similar analytical and quantitative/qualitative techniques.

Non-destructive imaging techniques, such as computer-aided tomography, x-rays and the like may be useful in determining the construction of the cell (anode outer wrap versus cathode outer wrap), as well as other features described herein, specifically including the presence and location of internal cell components. Additionally or alternatively, actual cell autopsies may be performed. Common analytical techniques, including normalized gravimetric analysis, dimensional measurements, inductively coupled plasma spectroscopy or gas chromatography-mass spectroscopy, may also be informative in determining the construction and features of a particular cell.

An example of a significant metric for battery discharge capacity is the ANSI Digital Still Camera Test ("DSC test"). The DSC test is an intermittent drain rate test which simulates the power demands of a digital camera, which typically require short periods of high power demand while the user takes photographic images, followed by longer periods of inactivity. Accordingly, the DSC test for a AA sized battery involves discharging the battery at 1500 mW for 2 seconds followed by 650 mW for 28 second, and this 30 second cycle is repeated for 5 minutes every hour (i.e., 10 cycles/hour) followed by a rest period (i.e., 0 mW) for 55 minutes. Each 30 second cycle is intended to represent one digital still camera image. This one hour cycle is repeated every hour until the battery first records an output voltage of less than 1.05, although cell designers may occasionally continue the test beyond this end point to further observe battery discharge characteristics. The final performance is quantified in terms of number of minutes or number of images taken (i.e., the number of images will always be double the number of minutes on this test). Significantly, the cyclic, high-power requirements of this test make it one of the most difficult benchmarks for a battery design, while at the same time producing the most meaningful basis of comparison for battery consumers. Numerous other intermittent tests are known and utilized in this field, including those specified by the American National Standards Institute ("ANSI"), the International Electrotechnical Commission ("IEC") and the like.

The entirety of the above description is particularly relevant to FR6 and FR03 cells. However, the invention might also be adapted to other cylindrical cell sizes where the sidewall height exceeds the diameter of the container, cells with other cathode coating schemes and/or seal and/or pressure relief vent designs.

Features of the invention and its advantages will be further appreciated by those practicing the invention. Furthermore, certain embodiments of the components and the performance of the cell assembled as described will be realized. It will be understood by those who practice the invention and those skilled in the art that various modifications and improvements may be made to the invention without departing from the teachings of the disclosed concepts. The scope of protection afforded is to be determined by the claims and by the breadth of interpretation allowed by law.

What is claimed:
1. A method for making a cathode outer wrap battery which does not experience premature voltage drop-off upon intermittent discharge of the battery, the method comprising:
   continuously coating a cathode mixture comprising iron disulfide onto both sides of a solid foil current collector and subsequently creating a plurality of zones of reduced electrochemical activity on at least one side of the current collector;

cutting the coated cathode into individual strips to create a plurality of individual cathodes so that the zone of reduced electrochemical activity is positioned at a terminal end of each individual cathode;

providing a separator and an anode consisting essentially of lithium or a lithium alloy wherein the anode does not include a current collector;

spirally winding the anode, the individual cathode strip and the separator into a electrode assembly so that less than 50% of an outermost surface of the electrode assembly, excluding the separator and optional non active components, is covered by the anode and the zone of reduced electrochemical activity is situated along the outermost surface of the electrode assembly; and disposing the electrode assembly in a conductive container, introducing a non-aqueous electrolyte to the container and closing the container.

2. The method according to claim 1, wherein the zone of reduced electrochemical activity is created by creating a mass free zone prior to disposing the electrode assembly in the container.

3. The method according to claim 2, wherein the mass free zone is created by providing a sacrificial substrate to the current collector prior to coating the cathode mixture and then removing the sacrificial substrate subsequent to coating the cathode mixture.

4. The method according to claim 2, wherein the mass free zone is created by physically removing the cathode coating as the cathode is cut into individual strips.

5. The method according to claim 1, wherein the zone of reduced electrochemical activity is created by discharging the cathode in the zone prior to disposing the electrode assembly in the container.

6. The method according to claim 1, wherein the zone of reduced electrochemical activity is created by insulating the cathode mixture from the ionic conductivity within the zone prior to disposing the electrode assembly in the container.

7. The method according to claim 1, wherein the zone of reduced electrochemical activity is created by reducing an amount of active cathode material in the zone prior to disposing the electrode assembly in the container.

8. The method according to claim 1, wherein the zone of reduced electrochemical activity is created by reducing the thickness of the cathode coating.

9. The method according to claim 1, wherein the zone of reduced electrochemical activity is created utilizing an initiator to induce a change within the cathode.

10. The method according to claim 9, wherein the initiator is selected from radiation, electromagnetic radiation or a light source.

11. The method according to claim 9, wherein the cathode mixture includes a chemical which reacts with or to the initiator.

12. The method according to claim 1, wherein the zone of reduced electrochemical activity is created by providing a spacer having a thickness that is: i) greater than a combined thickness of the anode, the cathode and the separator, or ii) at least twice the thickness of the cathode, inclusive of the coating on both sides and the current collector between the anode and the individual cathode strip proximate to the terminal end.

13. The method according to claim 1, wherein the zone of reduced electrochemical activity is created by relieving electrode stack pressure at the terminal end as the cell discharged.

14. The method according to claim 1, wherein the anode is provided in an amount to create an interfacial, theoretical anode-to-cathode input capacity ratio that is less than 1.0.

* * * * *